United States Patent
Kato et al.

(10) Patent No.: US 8,186,724 B2
(45) Date of Patent: May 29, 2012

(54) CONNECTING HEAD STRUCTURE FOR HIGH-PRESSURE FUEL INJECTION PIPES

(75) Inventors: Nobuo Kato, Susono (JP); Koichi Hayashi, Mishima (JP); Shoichiro Usui, Numazu (JP)

(73) Assignee: Usui Kokusai Sangyo Kaisha Limited (JP)

( * ) Notice: Subject to any disclaimer, the term of this patent is extended or adjusted under 35 U.S.C. 154(b) by 757 days.

(21) Appl. No.: 12/225,025

(22) PCT Filed: Mar. 9, 2007

(86) PCT No.: PCT/JP2007/054731
§ 371 (c)(1),
(2), (4) Date: Sep. 11, 2008

(87) PCT Pub. No.: WO2007/105659
PCT Pub. Date: Sep. 20, 2007

(65) Prior Publication Data
US 2009/0139595 A1 Jun. 4, 2009

(30) Foreign Application Priority Data

| Mar. 14, 2006 | (JP) | 2006-070023 |
| Sep. 15, 2006 | (JP) | 2006-251855 |
| Oct. 26, 2006 | (JP) | 2006-291838 |

(51) Int. Cl.
*F16L 25/00* (2006.01)
(52) U.S. Cl. .............................. 285/386; 285/247
(58) Field of Classification Search .......... 285/386, 285/389, 384, 385, 328, 353, 246, 247
See application file for complete search history.

(56) References Cited

U.S. PATENT DOCUMENTS

| 974,975 | A | * | 11/1910 | Kelly | 285/55 |
| 1,235,876 | A | * | 8/1917 | Cave | 285/247 |
| 1,862,833 | A | | 6/1932 | Stover | |
| 1,982,533 | A | | 11/1934 | Parker | |
| 2,219,266 | A | * | 10/1940 | Hirsch | 285/247 |
| 2,266,211 | A | * | 12/1941 | Kaiser | 285/247 |
| 2,517,669 | A | | 8/1950 | Hufferd et al. | |
| 2,704,678 | A | * | 3/1955 | Klein et al. | 285/261 |
| 3,025,086 | A | | 3/1962 | Mosely | |
| 3,191,971 | A | | 6/1965 | Somers | |
| 3,649,053 | A | | 3/1972 | Synder, Jr. | |

(Continued)

FOREIGN PATENT DOCUMENTS

DE 10143740 A1 4/2003

(Continued)

*Primary Examiner* — Aaron Dunwoody
(74) *Attorney, Agent, or Firm* — Gerald E. Hespos; Michael J. Porco

(57) ABSTRACT

A thick-wall small-diameter high-pressure fuel injection pipe has a spherical seat surface, an annular flange, and a conical surface continued from the seat surface at a connecting end of the pipe. If the pipe is configured so that t (thickness)/D (outer diameter)<0.3, then an axial distance from the connecting head end to the back face of the annular flange is 0.38D to 0.6D, a spherical radius of the seat surface is 0.45D to 0.65D, the annular flange outer diameter is 1.2D to 1.4D, and an inner peripheral surface of the head has a substantially flat cylindrical surface or a conical surface. If the pipe is configured so that t (thickness)/D (outer diameter)$\geqq$0.3, then the axial distance from the connecting head end to the back face of the annular flange is 0.38D to 0.7D.

19 Claims, 17 Drawing Sheets

U.S. PATENT DOCUMENTS

| | | | |
|---|---|---|---|
| 3,698,745 A | 10/1972 | Mundt | |
| 4,029,345 A | 6/1977 | Romanelli | |
| RE29,376 E | 8/1977 | Hiszpanski | |
| 193,993 A | 8/1977 | Pennie | |
| 4,134,430 A | 1/1979 | Mukasa et al. | |
| 4,135,741 A | 1/1979 | Albertsen | |
| 4,266,577 A | 5/1981 | Usui | |
| 4,469,356 A | 9/1984 | Duret et al. | |
| 4,602,796 A | 7/1986 | Setterberg | |
| 4,634,154 A * | 1/1987 | Arora et al. | 285/353 |
| 4,665,876 A | 5/1987 | Hashimoto | |
| 4,784,311 A | 11/1988 | Sugao | |
| 4,864,711 A | 9/1989 | Yokota | |
| 4,900,180 A | 2/1990 | Takikawa | |
| 5,058,935 A | 10/1991 | Eidsmore | |
| 5,109,888 A | 5/1992 | Usui | |
| 5,120,084 A | 6/1992 | Hashimoto | |
| 5,143,410 A | 9/1992 | Takikawa | |
| 5,145,219 A | 9/1992 | Babuder | |
| 5,169,182 A | 12/1992 | Hashimoto | |
| 5,340,161 A | 8/1994 | Bagnulo | |
| 5,344,195 A * | 9/1994 | Parimore et al. | 285/91 |
| 5,402,829 A | 4/1995 | Takikawa et al. | |
| 5,409,267 A | 4/1995 | Bagnulo | |
| 5,423,581 A | 6/1995 | Salyers | |
| 5,667,255 A * | 9/1997 | Kato | 285/133.4 |
| 5,709,413 A | 1/1998 | Salyers | |
| 5,903,964 A | 5/1999 | Uematsu et al. | |
| 5,957,507 A | 9/1999 | Asada | |
| 5,979,945 A | 11/1999 | Hitachi et al. | |
| 6,050,611 A | 4/2000 | Asada | |
| 6,070,618 A | 6/2000 | Iwabuchi | |
| 6,186,121 B1 | 2/2001 | Uematsu et al. | |
| 6,408,826 B2 | 6/2002 | Asada et al. | |
| 6,415,768 B1 | 7/2002 | Usui | |
| 6,595,558 B2 | 7/2003 | Kusanagi | |
| 6,824,173 B2 * | 11/2004 | Usui | 285/353 |
| 6,840,283 B2 * | 1/2005 | Furugen et al. | 138/109 |
| 6,843,275 B2 * | 1/2005 | Kato | 138/109 |
| 6,899,358 B2 * | 5/2005 | Richardson | 285/354 |
| 6,935,377 B2 * | 8/2005 | Furugen | 138/109 |
| 7,213,576 B2 * | 5/2007 | Furugen | 123/468 |
| 7,318,418 B2 * | 1/2008 | Usui et al. | 123/468 |
| 7,735,473 B2 * | 6/2010 | Kato et al. | 123/468 |
| 7,963,571 B2 * | 6/2011 | Martin | 285/354 |
| 2004/0135368 A1 * | 7/2004 | Furugen | 285/259 |
| 2004/0256014 A1 * | 12/2004 | Kato | 138/109 |
| 2006/0042710 A1 * | 3/2006 | Furugen | 138/109 |
| 2006/0163873 A1 * | 7/2006 | Langhuber et al. | 285/386 |
| 2006/0284421 A1 * | 12/2006 | Fonville et al. | 285/386 |

FOREIGN PATENT DOCUMENTS

| | | |
|---|---|---|
| FR | 2836701 A1 | 9/2003 |
| GB | 659623 | 10/1951 |
| JP | 2002-322965 | 11/2002 |
| JP | 2005-180218 | 7/2005 |
| WO | 2007105660 A1 | 9/2007 |

* cited by examiner

CONNECTING HEAD STRUCTURE FOR HIGH-PRESSURE FUEL INJECTION PIPES

BACKGROUND OF THE INVENTION

1. Field of the Invention

The present invention relates to a connecting head structure for high-pressure fuel injection pipes made from thick-wall steel pipes with a relatively small diameter disposed and commonly used as a supply passage for a fuel in a diesel internal-combustion engine, for example.

2. Description of the Related Art

A known conventional high-pressure fuel injection pipe having this type of connecting head has, as exemplified in FIG. 17, a connecting head portion 112 of a thick-wall steel pipe 111 with a relatively small diameter in which a spherical seat surface 113, an annular flange portion 115 provided with an interval from the seat surface 113 in the shaft center direction, and an arc surface 114 continued from the seat surface 113 to the annular flange portion 115 and tapered toward the tip end (See FIG. 4 of Japanese Patent Laid-Open Print No. 2003-336560). In this type of connecting head 112, in relation to molding by buckling machining by pressing with a punching member from outside in the shaft center direction, the inner diameter is expanded and stress is concentrated on the inner peripheral surface of the head portion with outward expansion of the peripheral wall used by the buckling machining by pressing so as to cause a pocket (annular recessed portion) 116 in which a tensile stress of the internal peripheral surface is increased and the connecting head has been used in this circumstance. However, there have been problems that cavitation erosion might occur in the vicinity of the pocket portion due to the high-pressure fluid when used, a radial crack might be generated radially in the connecting head portion from the pocket as a starting point due to fatigue breakdown, or a circumferential crack might be caused around the pocket due to the fatigue breakdown.

As a measure against those problems, the applicant proposed a method for making the pocket inside the head generated in molding of the connecting head shallow and gentle in a high-pressure fuel injection pipe having a connecting head of a thick-wall steel pipe with a relatively small diameter, for example, formed by a spherical seat surface, an annular flange portion provided with an interval from the seat surface in the shaft center direction, and a conical surface continued from the seat surface to the annular flange portion and tapered toward the tip end by providing an annular curved recessed groove with a small depth at a part of the conical surface (See FIG. 1 of Japanese Patent Laid-Open Print No. 2003-336560), a method for covering the pocket inside the head generated in molding of the connecting head having the outer peripheral surface in the truncated conical shaped or a truncated arc shaped seat surface with respect to the mating seat portion with a metal cylindrical member attached inside the head (Japanese Patent Laid-Open Print No. 2005-180218) and the like.

The present invention has an object to propose a connecting head structure for high-pressure fuel injection pipes which can obtain an effect equal to or better than the above proposed arts as means for preventing generation of a crack at a trough portion of the pocket involved with formation of the pocket in molding of the head portion, generation of a crack by cavitation erosion caused in the vicinity of the pocket portion by a flow of the high-pressure fluid when used, and generation of a phenomenon of tensile stress rise on the inner surface due to increased inner diameter and stress concentration due to formation of the pocket in molding of the head.

SUMMARY OF THE INVENTION

A connecting head structure for high-pressure fuel injection pipes according to the present invention has, at a connecting end of a thick-wall small-diameter steel pipe with a relatively small diameter, a spherical seat surface, an annular flange portion formed with an interval from the seat surface in the shaft center direction, and a conical surface having a substantially spherical shape or being similar to a substantially spherical surface continued from the seat surface to the annular flange portion or the vicinity of the annular flange portion and tapered toward the tip end, and a tightening nut is incorporated directly or indirectly engaging with the back face of the annular flange portion, in which in the case of a thick-wall small-diameter steel pipe of t (thickness)/D (outer diameter)<0.3, a distance L1 in the axial direction from the connecting head end to the annular flange portion back face is 0.38D to 0.6D, the spherical radius of the seat surface is 0.45D to 0.65D, and the outer diameter D1 of the annular flange portion is 1.2D to 1.4D, and the head inner peripheral surface has an outline of a section in the pipe axial direction close to the diameter of the inner peripheral surface of the steel pipe in a substantially flat cylindrical face and/or conical face.

Also, the present invention is a connecting head structure for high-pressure fuel injection pipes characterized in that a connecting end of a thick-wall small-diameter steel pipe with a relatively small diameter has a spherical seat surface, an annular flange portion formed with an interval from the seat surface in the shaft center direction, and a conical surface having a substantially spherical shape or being similar to a substantially spherical surface continued from the annular flange portion to the annular flange portion or the vicinity of the annular flange portion and tapered toward the tip end and incorporates a tightening nut engaged directly or indirectly with the back face of the annular flange portion, in which in the case of a thick-wall small-diameter steel pipe of t (thickness)/D (outer diameter)≧0.3, the distance L1 in the axial direction from the connecting head end to the annular flange back face is 0.38D to 0.7D, the spherical radius of the seat surface is 0.45D to 0.65D, and the outer diameter D1 of the annular flange portion is 1.2D to 1.4D, and the head inner peripheral surface has an outline of a section in the pipe axial direction close to the diameter of the inner peripheral surface of the steel pipe in a substantially flat cylindrical face and/or conical face.

Moreover, the present invention is characterized in that a vertex angle θ of the conical surface (pressing seat surface) of the connecting head continued from the spherical seat surface to the annular flange portion or the vicinity of the annular flange portion and tapered toward the tip end is 50 to 60 degrees, the maximum diameter of the conical surface is 1.03D to 1.09D, and the maximum diameter portion of the conical surface and the annular flange portion continue in a conical surface, a conical surface with a convex or concave outline, or a cylindrical surface.

The annular flange portion in the connecting head of the present invention is preferably formed in the annular projecting outward in the pipe diameter direction from the maximum diameter of the spherical surface constituting the seat surface, and a cylindrical washer or a cylindrical washer with flange may be closely fitted or freely fitted in a neck lower part of the annular flange portion. Moreover, on the back face side of the annular flange portion, continuing to the back face of the annular flange portion and over the length corresponding to the washer length, a large diameter portion with the pipe outer diameter of 1.02D to 1.08D and a tapered portion continued from the large diameter portion and having an outer diameter smoothly reduced in the pipe axial direction may be provided. The length of the washer is preferably 0.5D to 2.0D. Also, the tightening nut contact surface of the washer may be a spherical surface with the spherical radius of 1.0D to 2.5D and moreover, the washer contact surface of the tightening nut may be a conical surface with the vertex angle θ1 of 90 to 150 degrees.

Also, when the inner diameter of the thick-wall small-diameter steel pipe is Din, the conical surface of the present invention is preferably in the conical shape with a connecting head opening diameter DT of 1.2Din to 1.6Din and the taper depth Lt of the conical surface of 0.65L1 to 1.3L1. Moreover, the back face of the annular flange portion preferably forms a surface perpendicular to the pipe shaft or a conical surface whose diameter is reduced toward the rear of the pipe shaft, and the vertex angle θ2 of the conical surface of the annular flange portion back face is preferably 75 to 120 degrees.

Furthermore, when the spherical radius R of the seat surface of the present invention is 0.57D to 0.65D, the inner diameter portion of the connecting head is preferably conical, and when the back face of the annular flange portion is a conical surface, the inner diameter portion of the connecting head is preferably conical, and moreover, when the inner diameter Din of the thick-wall small-diameter steel pipe is 0.4D to 0.63D, the inner diameter portion of the connecting head is preferably conical.

A soft layer may be provided on the seat surface of the connecting head structure for high-pressure fuel injection pipes according to the present invention, and the soft layer is preferably a decarbonized layer. Moreover, the head opening is preferably tapered/chamfered or in a flare with round chamfering.

In the connecting head structure for high-pressure fuel injection pipes according to the present invention, since the inner peripheral surface of the connecting head has an outline of a section of a substantially flat face in the pipe axial direction close to the inner peripheral surface of the steel pipe, little or no pocket (annular recessed portion) generated by plastic machining exists inside the connecting head. Thus, there is no fear of generation of a crack at a trough portion of the pocket portion in molding of the head, generation of a crack by cavitation erosion by a fluid pressure in the head, and the phenomenon of tensile stress rise of the inner surface by increased diameter and stress concentration, and a possibility that the inner peripheral surface of the connecting head becomes a starting point of fatigue breakdown can be radically reduced.

Also, by increasing the vertex angle and the maximum diameter of the conical surface of the connecting head, which increases the width of the both seat surfaces at tightening, deformation of the both seat surfaces can be reduced by preventing rise of the maximum contact surface pressure, and a remaining deformation amount of the mating seat surface at releasing can be made small.

Moreover, in the connecting head structure of the present invention, when the thickness of the high-pressure fuel injection pipe is relatively small and the spherical body of the connecting head seat surface is relatively large (when the pipe inner diameter Din is 0.4D to 0.63D and the spherical radius R of the seat surface is 0.57D to 0.65D, for example), by making the inner diameter portion of the connecting head conical, a volume of a space constituting the connecting head is increased and the volume of the steel material is reduced, and by actively bringing a core metal into contact with the inner surface in molding of the head, buckling is reduced and the pocket can be made further small. Furthermore, even if the pipe inner diameter Din is in a range of 0.4D to 0.63D and the annular flange portion back face is conical, for example, the pocket can be made further small. Furthermore, even outside the range such that the pipe inner diameter is less than 0.4D or the spherical radius R is less than 0.57D, for example, by making the inner diameter portion of the connecting head conical, an effect can be obtained that the pocket can be made further small or can be eliminated.

In the present invention, a plastic deformation amount of a seal surface (seat surface) of a mating part joint portion such as a common rail is reduced by providing a soft layer on the seat surface, and high sealing performance can be obtained at repeated tightening. Moreover, since a distance from the head end to the annular flange portion is relatively reduced in the connecting head of the present invention, rigidity of the spherical seat portion is enhanced, permanent deformation such as narrowing of the head opening involved with tightening can be prevented, and seating on a pressure receiving seat surface of the mating part joint portion is stabilized. Also, fuel diffusion due to leakage or disengagement of a connection portion can be prevented against repeated pressurization of a super high-pressure fuel flow and vibration of a diesel internal-combustion engine or the like and combined with smoothing action of the fuel flow due to absence of the annular pocket, accurate fuel injection is enabled.

DETAILED DESCRIPTION OF THE PREFERRED EMBODIMENTS

Figure 1:
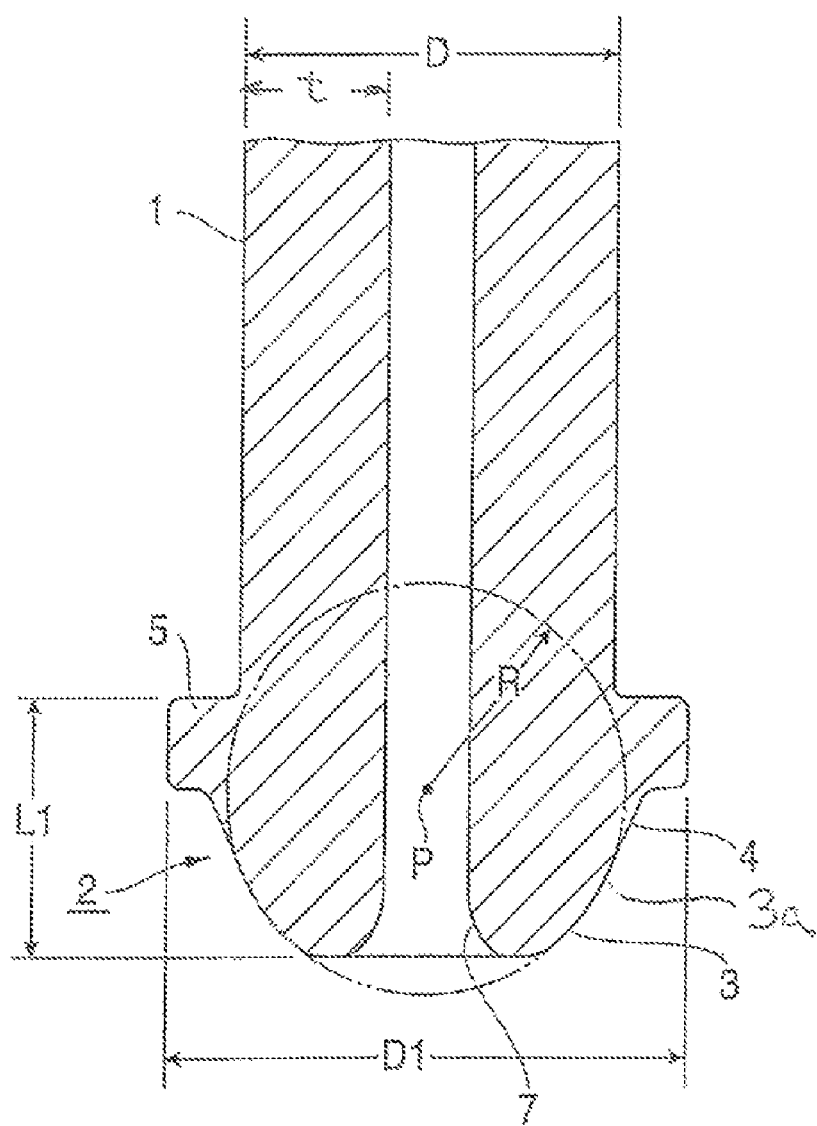
FIG. 1 is a longitudinal side view illustrating a first embodiment of a connecting head structure for high-pressure fuel injection pipes according to the present invention.

In the connecting head structure of the present invention, in the case of a thick-wall small-diameter steel pipe of t (thickness)/D (outer diameter)<0.3, the axial distance L1 from the connecting head end to the annular flange portion back face is limited to 0.38D to 0.6D because if it is less than 0.38D, the head can not be formed, while if it is more than 0.6D, a pocket is generated and the pocket gradually becomes bigger. Moreover, the annular flange portion outer diameter D1 is set at 1.2D to 1.4D because if it is less than 1.2D, a wide pressing area for transmitting a large axial force can not be ensured in tightening with the mating part, while if it is more than 1.4D, a pocket is generated and the pocket gradually becomes bigger.

Furthermore, in the connecting head structure of the present invention, in the case of a thick-wall small-diameter steel pipe of t (thickness)/D (outer diameter)≧0.3, the axial distance L1 from the connecting head end to the annular flange portion back face is limited to 0.38D to 0.7D because if it is less than 0.38D, the head can not be formed, while if it is more than 0.7D, a pocket is generated and the pocket gradually becomes bigger. The reason why the spherical radius R of the seat surface and the annular flange portion outer diameter D1 are numerically limited is the same as the case of the thick-wall small-diameter steel pipe with t (thickness)/D (outer diameter)<0.3, and the reason is omitted.

Also, in the present invention, the vertex angle θ of the conical surface continued from the spherical seat surface to the annular flange portion or the vicinity of the annular flange portion and tapered toward the tip end is limited to 50 to 60 degrees due to the following reasons.

In the connecting head structure for high-pressure fuel injection pipes of the present invention, when the injection pipe side has a material more rigid than the mating part or having hardness close to that of the mating part, there is a fear that the mating seat surface is plastically deformed by the seat surface of the connecting head at tightening of the end and an indentation (recess) is generated on the conical surface of the connecting head of the present invention. Therefore, the present invention employs technical means for properly setting the vertex angle of the conical surface in the connecting head. That is, it is found that, by increasing the vertex angle of the conical surface of the connecting head, which increases a width of the contact surface with respect to the mating seat surface (pressure receiving seat surface) generated at the injection pipe tightening, rise of the maximum contact surface pressure is prevented and deformation (hitting depth of the mating seat surface) can be reduced, and a remaining deformation amount of the mating seat surface can be made small. And a proper vertex angle of the conical surface is found to be 50 to 60 degrees. If the vertex angle θ of the conical surface is less than 50 degrees, the effect of increasing a contact surface with the mating seat surface can not be sufficiently obtained, but the mating seat surface is deformed, which causes a dent (recess), while if the vertex angle θ of the conical surface exceeds 60 degrees, the angle becomes larger than the vertex angle of the mating seat surface, which is usually a conical surface with the vertex angle of 60 degrees, and assembling can not be carried out any more.

The vertex angle θ of the conical surface on the injection pipe side is limited to 50 to 60 degrees in the present invention, since consideration was given to the fact that the injection pipe side has a material more rigid than the mating part or a material close to the hardness of the mating part, but if the hardness of the mating part side is higher than that of the injection pipe side, the vertex angle of the conical surface on the injection pipe side may be 25 to 40 degrees with which a pocket is more hardly formed.

Moreover, in the present invention, the maximum diameter of the conical surface is limited to 1.03D to 1.09D, since if it is less than 1.03D, the edge of the maximum diameter portion of the conical surface hits the mating seat surface at tightening of the end, the contact surface pressure of the portion is raised and deformation of the mating seat surface (pressure receiving seat surface) is increased, while if it is more than 1.09D, the volume outside the connecting head becomes so large that there is a fear that a wrinkle or the like is generated on the inner surface of the connecting head.

Furthermore, the length of the washer is set to 0.5D to 2.0D since if it is less than 0.5D, assembling workability of the washer to the high-pressure fuel injection pipe is worsened, while if it is more than 2.0D, the entire length of a nut is too long and layout performance is deteriorated, which also leads to heavy-weight and cost-up.

As a steel type of the thick-wall small-diameter steel pipe in the present invention, a stainless steel pipe, a trip steel pipe, a carbon steel pipe and the like are suitable.

In the connecting head structure of the present invention, the annular flange portion is formed in the annular projecting outward in the pipe radial direction from the maximum diameter of the spherical surface constituting the seat surface in order to ensure a wide pressure area so that a high axial force is transmitted in tightening with the mating part.

Moreover, the tightening nut contact surface of the washer is made as a spherical surface and the spherical radius is limited to 1.0D to 2.5D since if it is less than 1.0D, there is a fear that the contact part with the nut comes to the vicinity of the inner diameter of the washer and deforms the washer so as to cause biting on the pipe, while if it is more than 2.5D, the contact surface comes close to the outer periphery of the washer and deforms the washer outer peripheral end toward the outer diameter side and brings it into contact with the nut inner peripheral surface.

Furthermore, the washer contact surface of the tightening nut is made as a conical surface and the vertex angle θ1 of the conical surface is limited to 90 to 150 degrees, since if it is less than 90 degrees, there is a fear that the contact surface with the washer comes to the vicinity of the outer periphery of the washer and deforms the inner peripheral surface of the nut so as to lower the axial force, while if it is more than 150 degrees, the contact portion with the washer comes close to the inner diameter of the washer and deforms the washer toward the inner diameter side, which causes biting into the pipe surface.

Also, in the connecting head structure of the present invention, as a forming condition of the conical surface, when the inner diameter of the thick-wall small-diameter steel pipe is Din, the connecting head opening diameter DT is set to 1.2Din to 1.6Din and the taper depth LT of the conical surface to 0.65L1 to 1.3L1 in the inner surface of the connecting head due to the following reasons.

If the connecting head opening diameter DT is less than 1.2Din, a space constituting the connecting head is small, a large volume is needed and a pocket hardly becomes small, while if it is more than 1.6Din, the thickness of the connecting head tip end becomes extremely thin, which makes formation geometrically impossible, and the tip end of the connecting head tends to be easily deformed at tightening with the mating part.

If the taper depth LT is less than 0.65L1, an effect to increase the volume of the space at the connecting head tip end so as to reduce the volume of a steel material can not be sufficiently obtained, while if it is more than 1.3L1, the thickness held between a core metal of a molding die and a chuck is made smaller than the original thickness, which makes machining difficult, and vibration-resistant bending fatigue is lowered.

The head opening is made in the flare configuration in the present invention in order to reduce inflow resistance of fuel into the pipe and to decrease a pressure loss.

Figure 2:
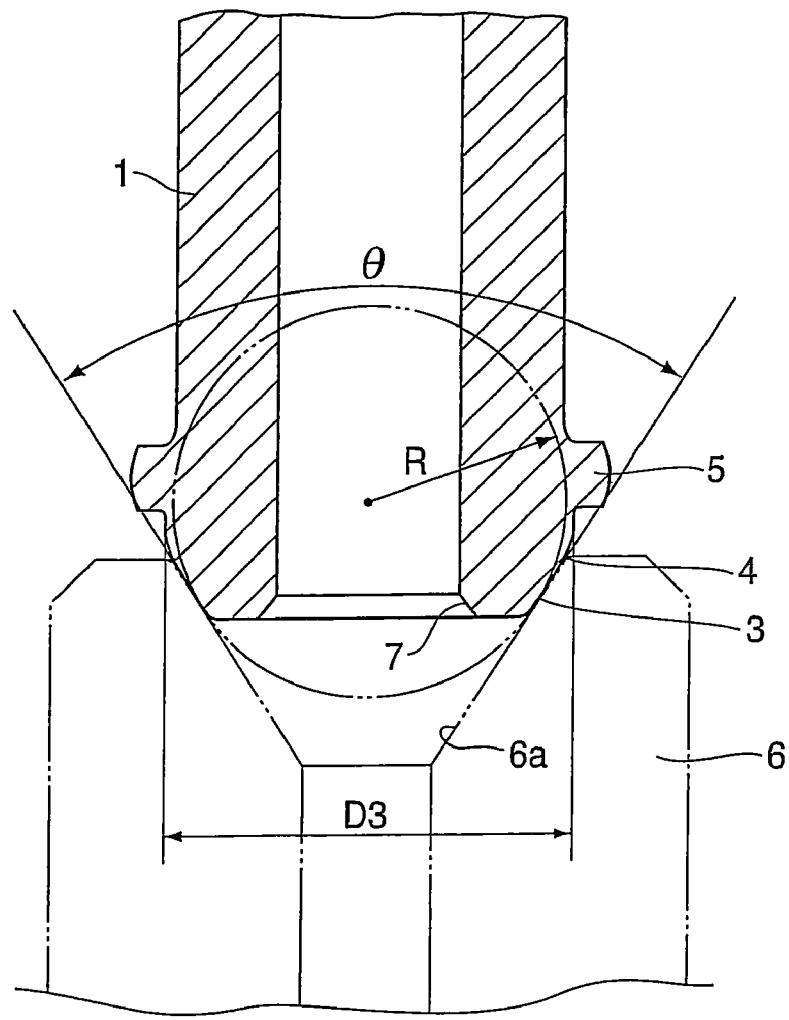
FIG. 2 is a longitudinal side view illustrating a second embodiment of the connecting head structure.
Figure 3:
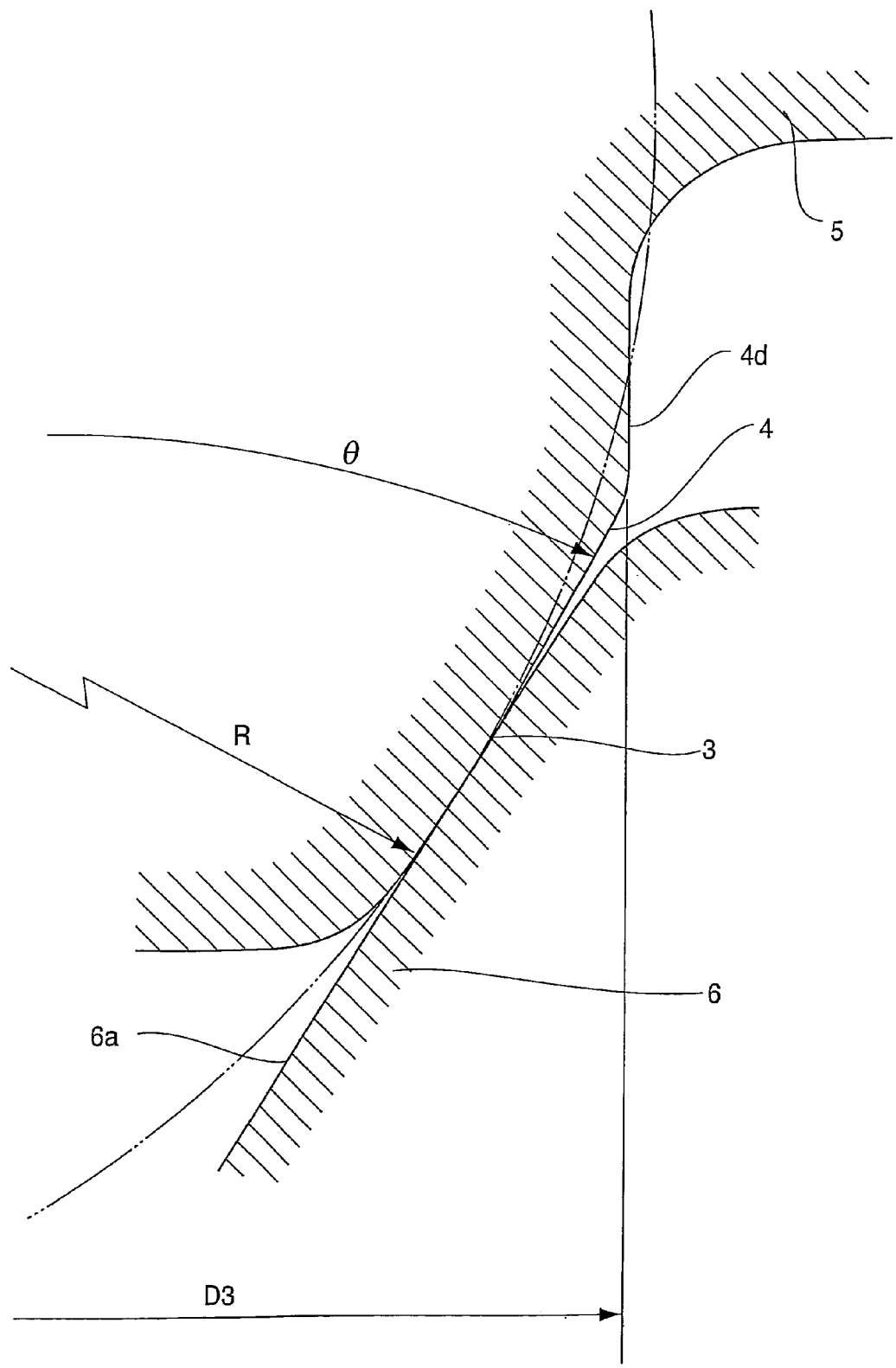
FIG. 3 is an enlarged longitudinal side view illustrating a seat surface portion the second embodiment connecting shown in FIG. 2.
Figure 4:
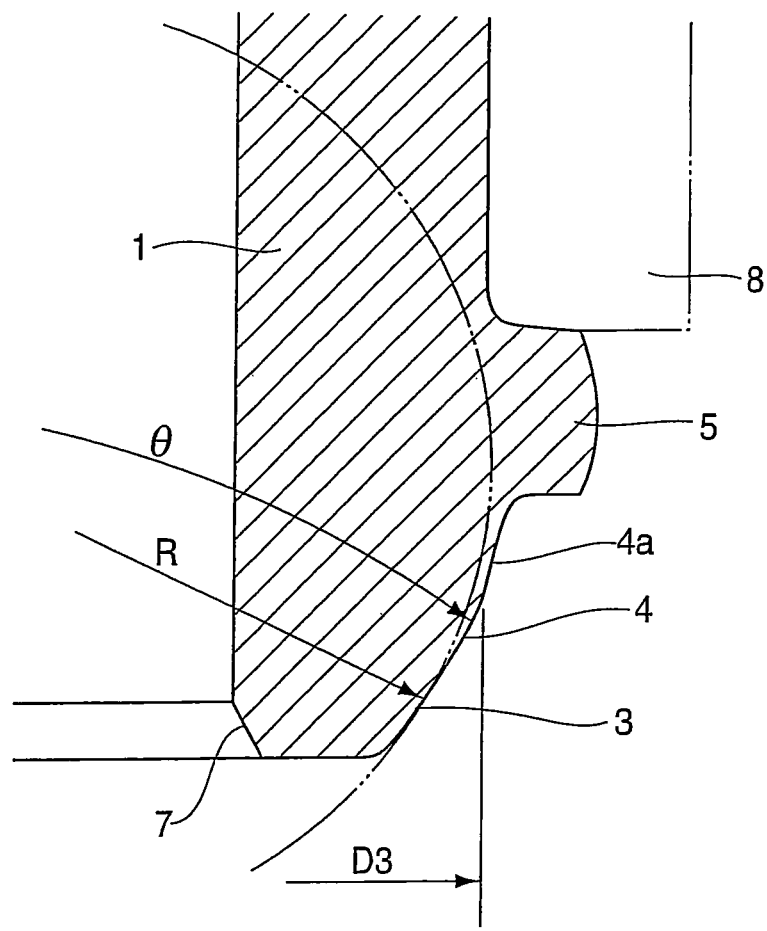
FIG. 4 is an enlarged longitudinal side view illustrating an essential part of a third embodiment of the connecting head structure.
Figure 5:
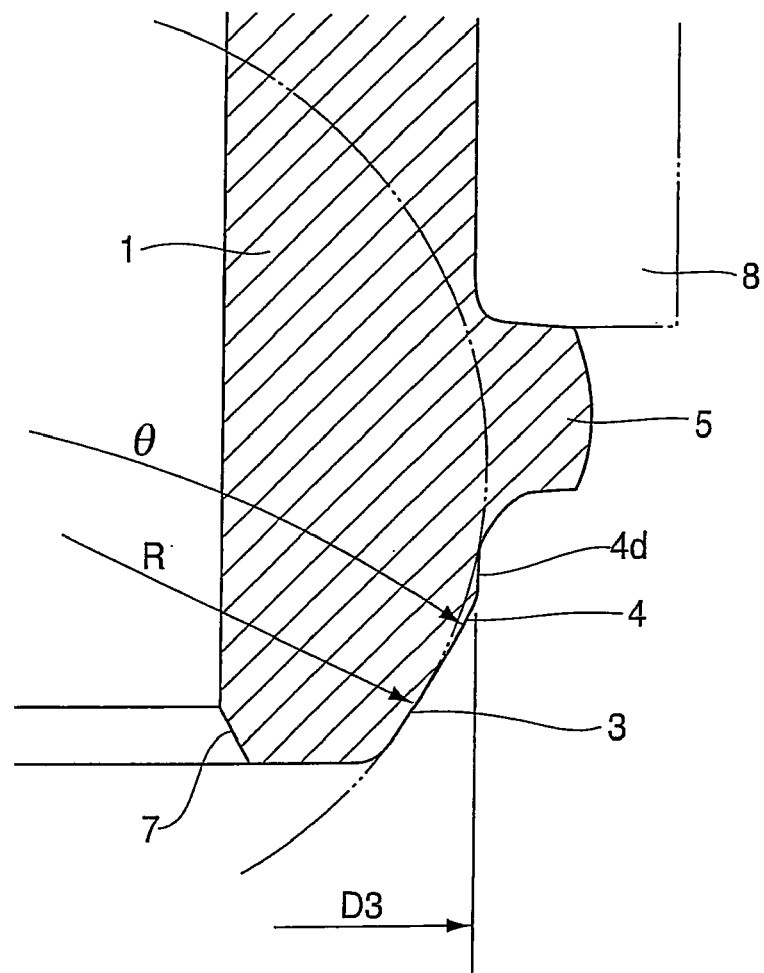
FIG. 5 is an enlarged longitudinal side view illustrating an essential part of a fourth embodiment of the connecting head structure.
Figure 6:
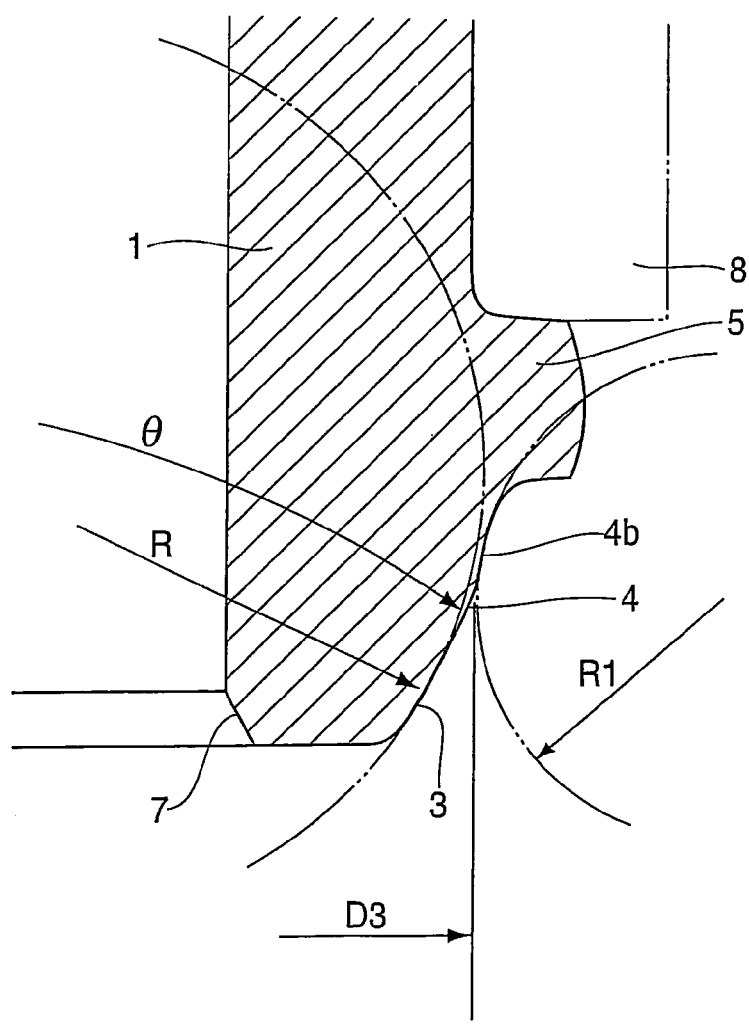
FIG. 6 is an enlarged longitudinal side view illustrating an essential part of a fifth embodiment of the connecting head structure.
Figure 7:
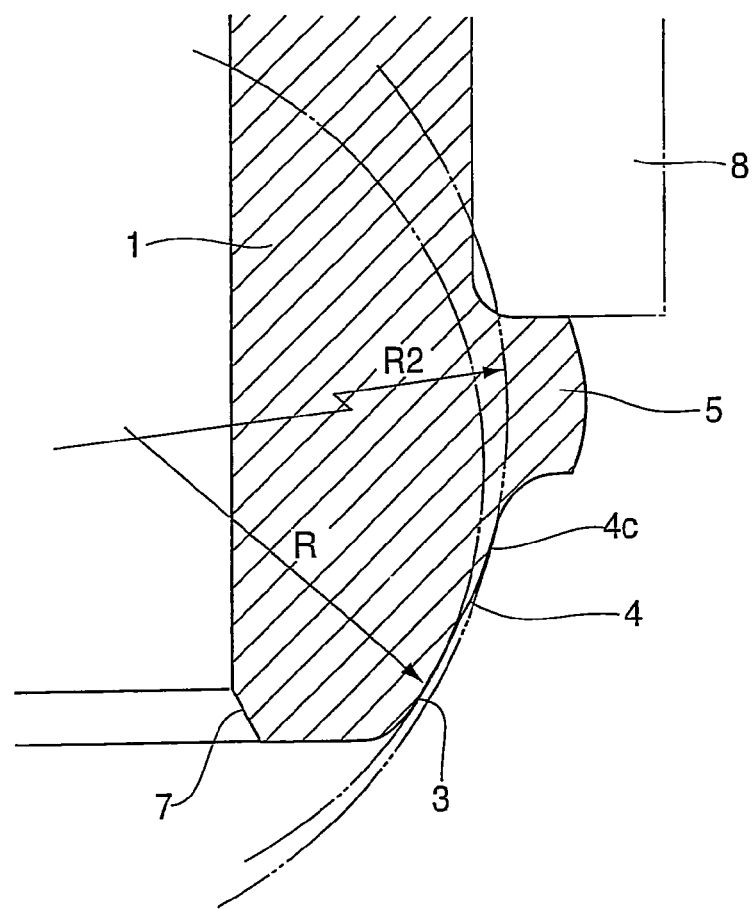
FIG. 7 is an enlarged longitudinal side view illustrating an essential part of a sixth embodiment of the connecting head structure.
Figure 8:
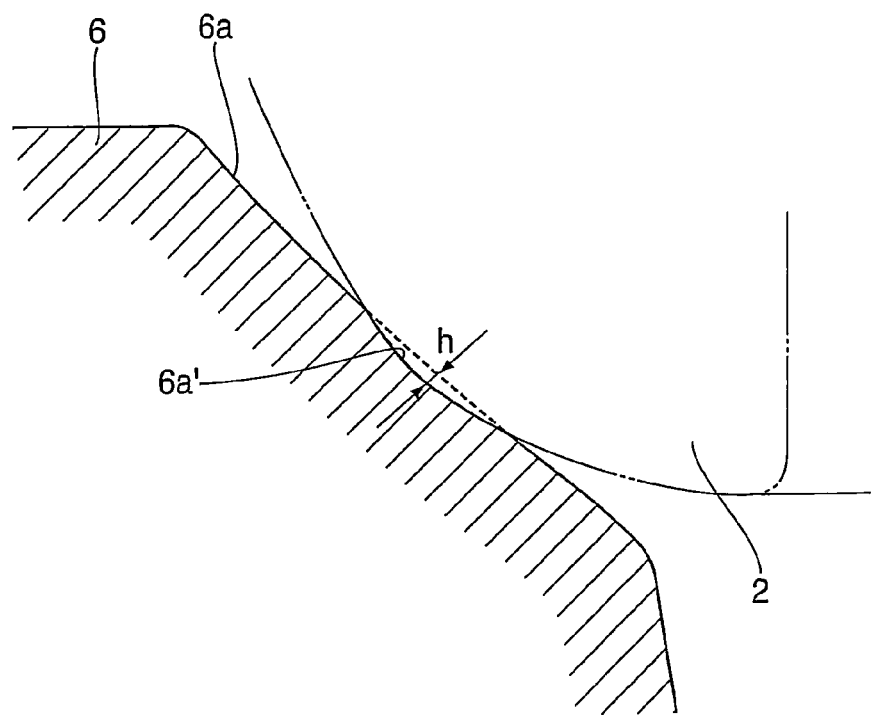
FIG. 8 is an explanatory view of a deformation amount (hitting depth h) of a mating seat surface in the embodiment of the present invention.
Figure 9:
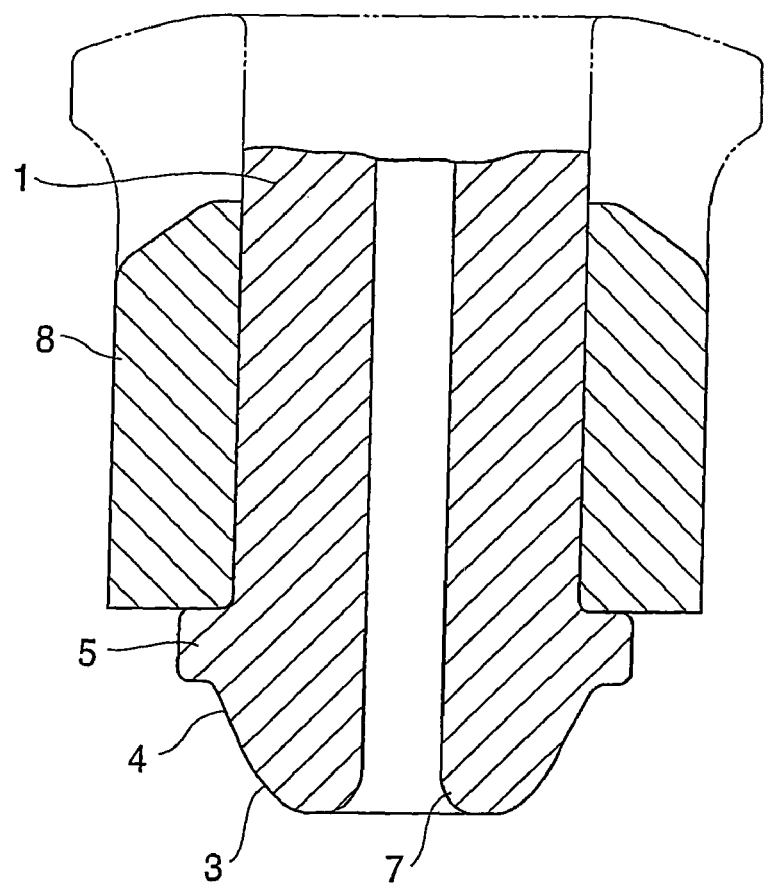
FIG. 9 is a side view illustrating a state where a washer (sleeve washer) is fitted to the connecting head shown in FIG. 1.
Figure 10:
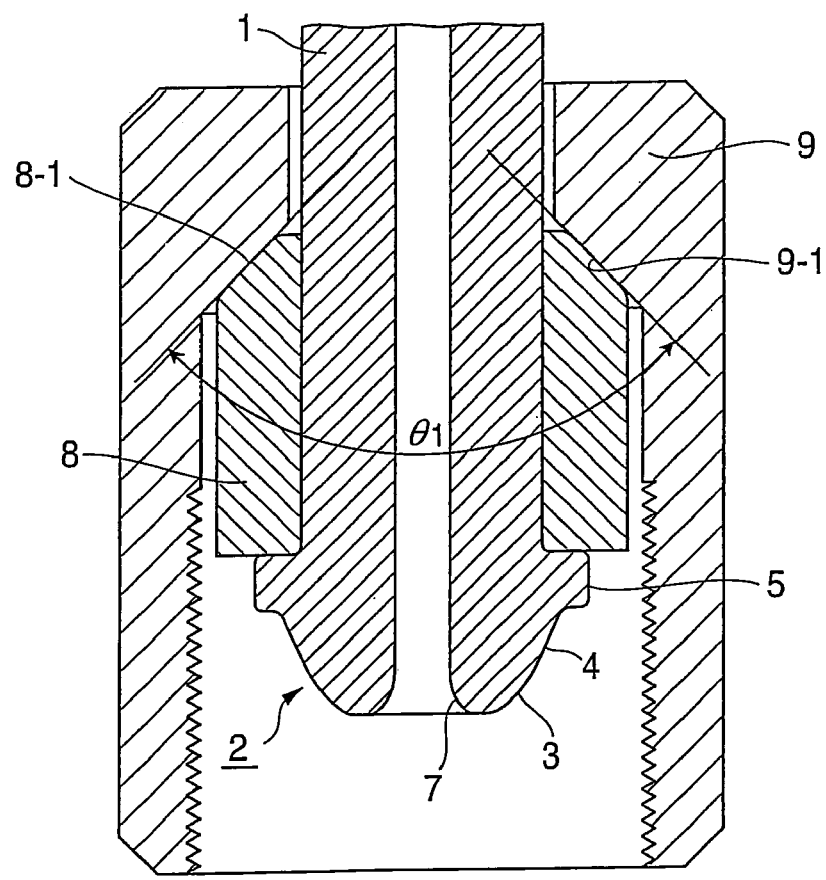
FIG. 10 is an enlarged longitudinal sectional view illustrating the washer and a nut.
Figure 11:
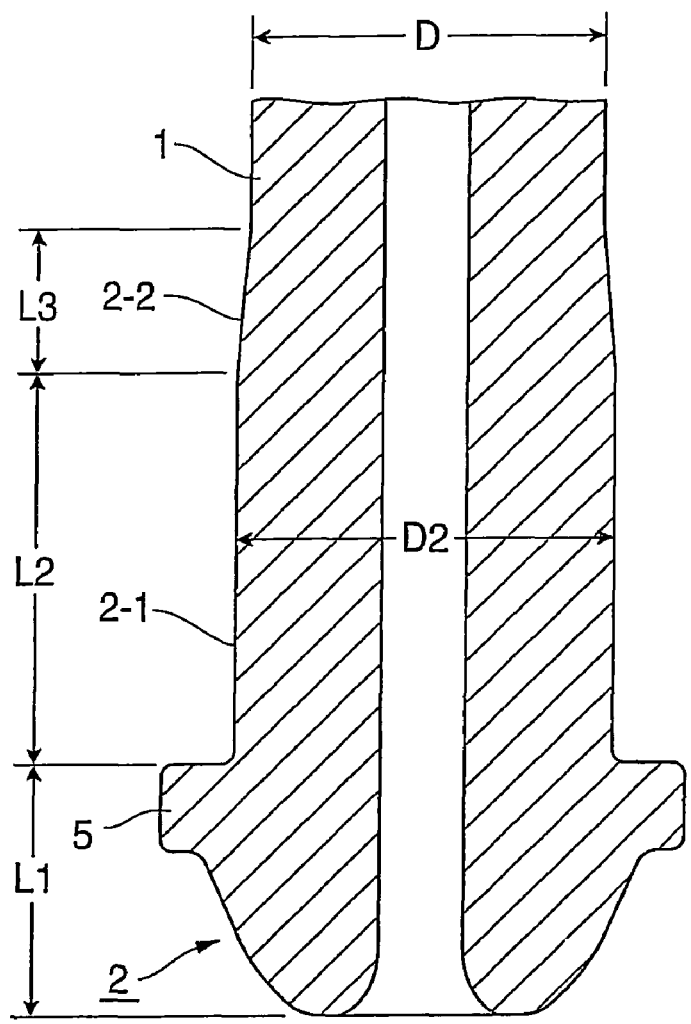
FIG. 11 is a longitudinal sectional view illustrating a seventh embodiment of the connecting head structure for high-pressure fuel injection pipes according to the present invention.
Figure 12:
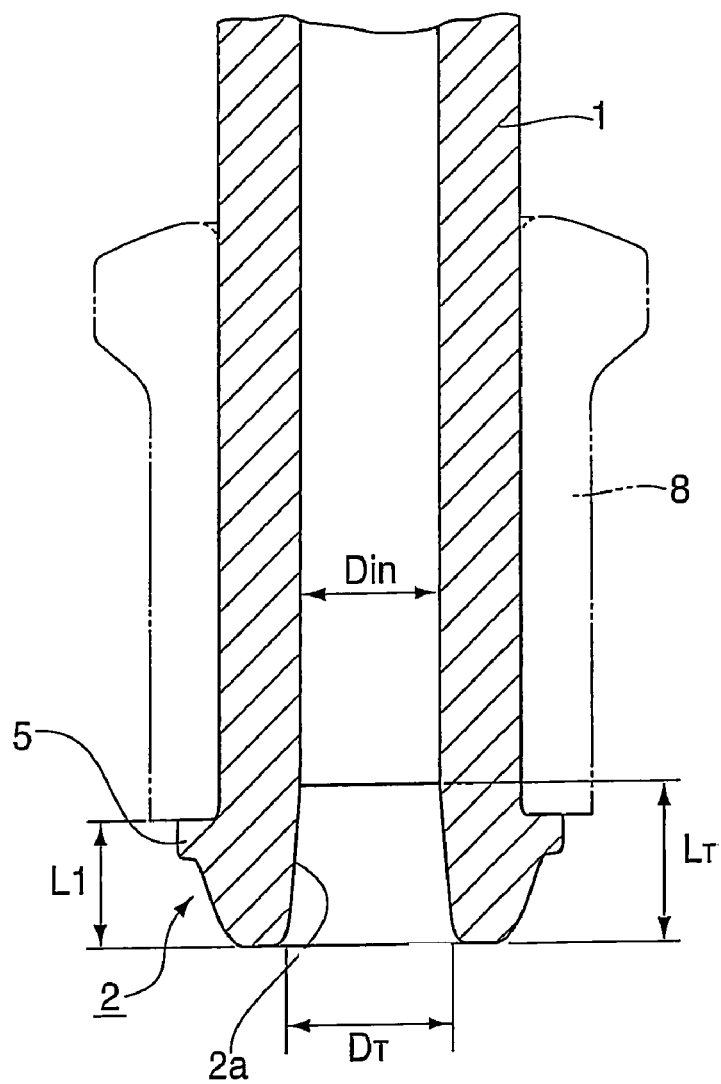
FIG. 12 is a longitudinal sectional view illustrating an eighth embodiment of the connecting head structure.
Figure 13:
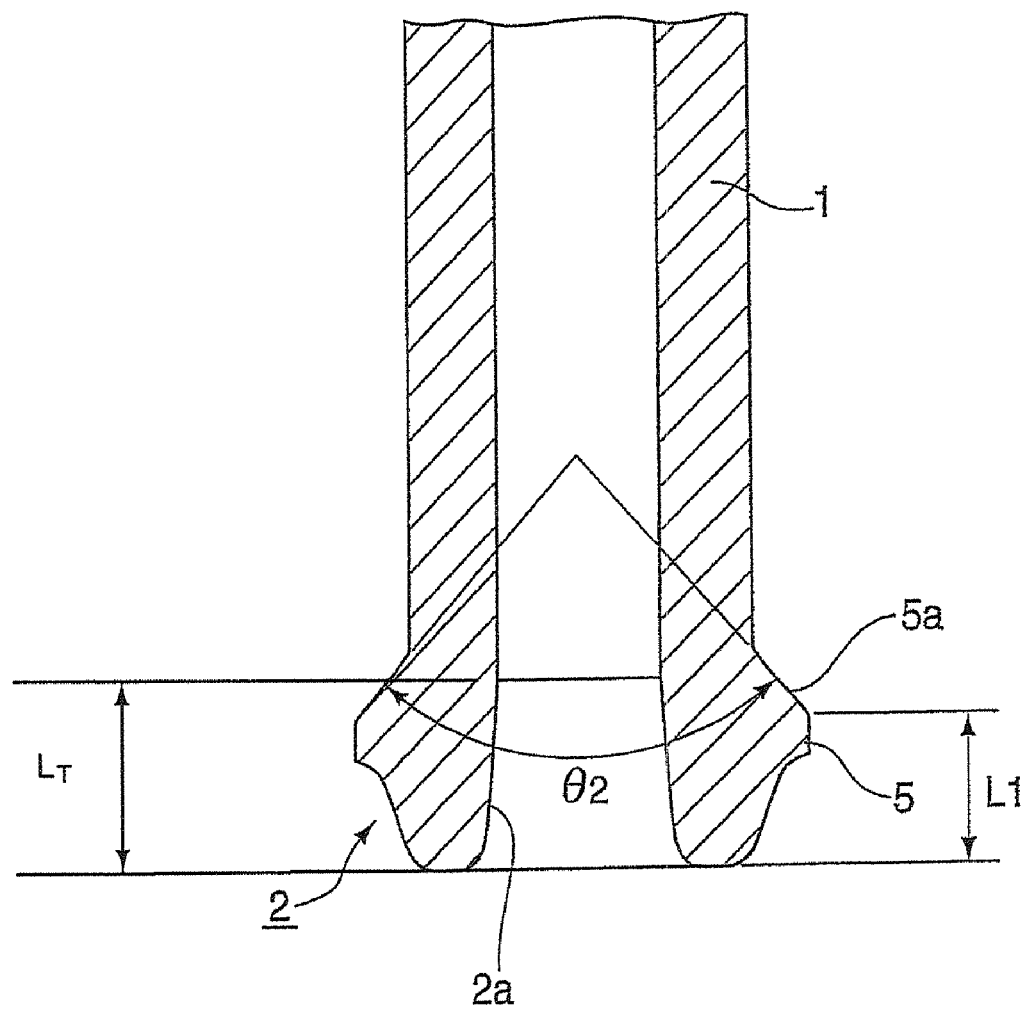
FIG. 13 is a longitudinal sectional view illustrating a ninth embodiment of the connecting head structure.
Figure 14:
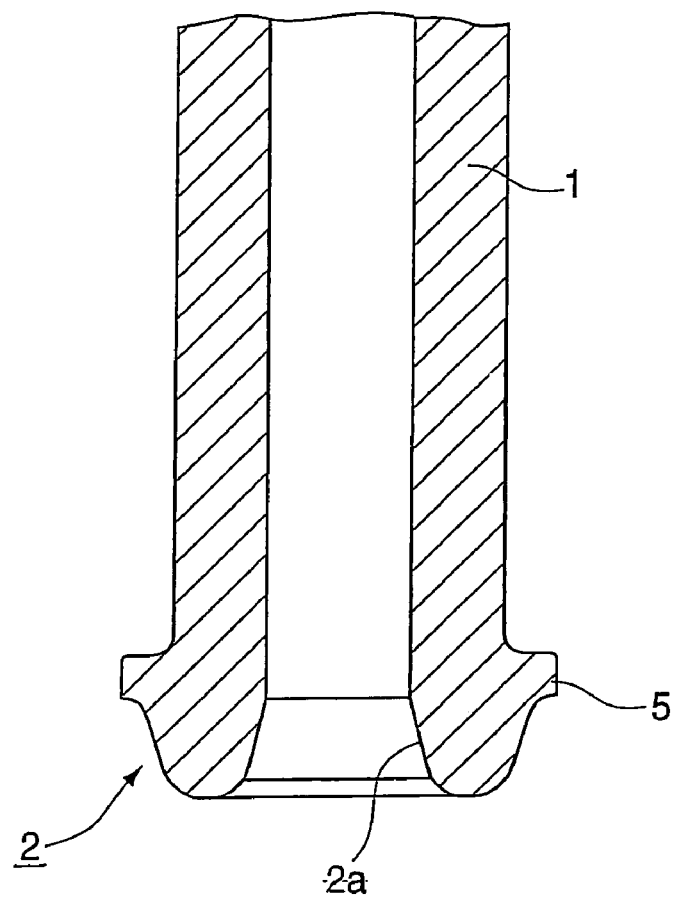
FIG. 14 is a longitudinal sectional view illustrating a tenth embodiment of the connecting head structure.
Figure 15:
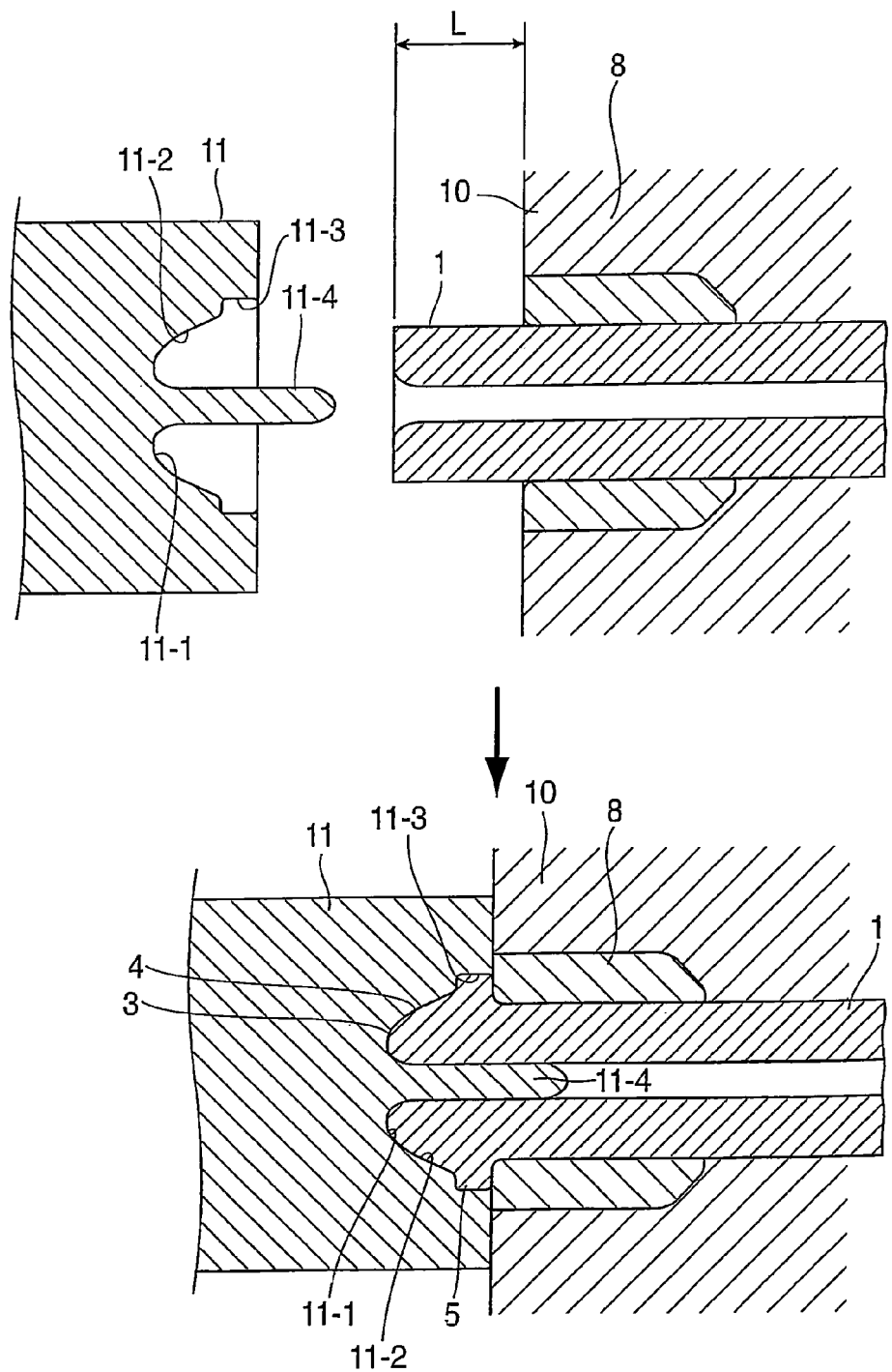
FIG. 15 is an explanatory view by a longitudinal section illustrating an example of a machining process according to a molding method of the connecting head shown in FIG. 1.
Figure 16:
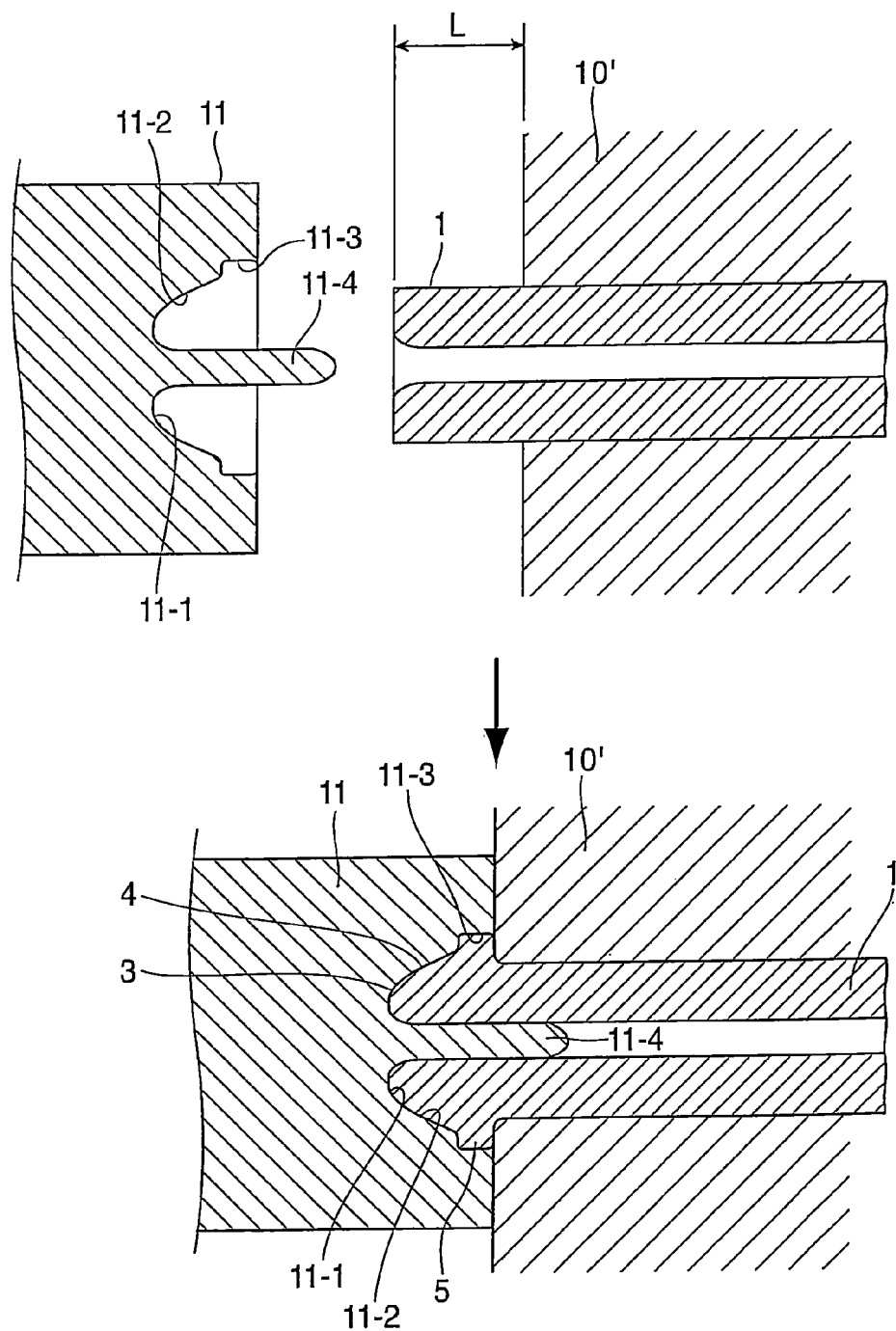
FIG. 16 is an explanatory view by a longitudinal section illustrating another example of a machining process according to a molding method of the connecting head shown in FIG. 1.
Figure 17:
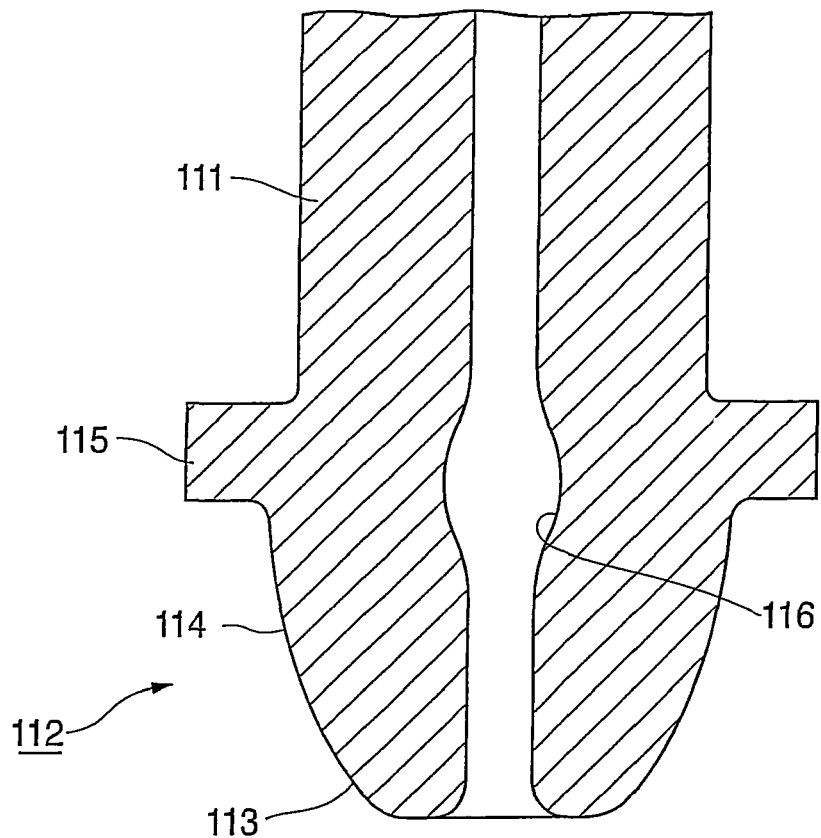
FIG. 17 is a longitudinal sectional side view illustrating an example of a conventional connecting head for high-pressure fuel injection pipes to which the present invention is to be applied.

FIG. 1 is a longitudinal sectional view illustrating a first embodiment of a connecting head structure for high-pressure fuel injection pipes according to the present invention, FIG. 2 is a longitudinal side view illustrating a second embodiment of the connecting head structure, FIG. 3 is an enlarged longitudinal side view illustrating a seat surface portion of the second embodiment shown in FIG. 2, FIG. 4 is an enlarged longitudinal side view illustrating an essential part of a third embodiment of the connecting head structure, FIG. 5 is an enlarged longitudinal side view illustrating an essential part of a fourth embodiment of the connecting head structure, FIG. 6 is an enlarged longitudinal side view illustrating an essential part of a fifth embodiment of the connecting head structure, FIG. 7 is an enlarged longitudinal side view illustrating an essential part of a sixth embodiment of the connecting head structure, FIG. 8 is an explanatory view of a deformation amount (hitting depth h) of a mating seat surface in the embodiment of the present invention, FIG. 9 is a side view illustrating a state where a washer (sleeve washer) is fitted with the connecting head shown in FIG. 1, FIG. 10 is an enlarged longitudinal sectional view of a contact engagement portion between the washer and the nut, FIG. 11 is a an enlarged longitudinal side view illustrating an essential part of a seventh embodiment of the connecting head structure for high-pressure fuel injection pipes according to the present invention, FIG. 12 is a longitudinal side view illustrating an eighth embodiment of the connecting head structure, FIG. 13 is a longitudinal side view illustrating a ninth embodiment of the connecting head structure, FIG. 14 is a longitudinal side view illustrating a tenth embodiment of the connecting head structure, FIG. 15 is an explanatory view by a longitudinal section illustrating an example of a machining process according to a molding method of the connecting head shown in FIG. 1, and FIG. 16 is an explanatory view by a longitudinal section illustrating another example of the machining process according to the molding method of the connecting head shown in FIG. 1, in which reference numeral 1 denotes a thick-wall small-diameter steel pipe, reference numeral 2 denotes a connecting head, reference symbol 2a denotes a conical surface, reference numeral 3 denotes a spherical seat surface (pressing seat surface), reference symbols 4, 4a, 4b, and 4c are substantially conical surfaces, reference symbol 4d denotes a cylindrical surface, reference numeral 5 denotes an annular flange portion, reference symbol 5a denotes a back face made as a conical surface (tapered surface), reference numeral 6 is a mating part, reference symbol 6a is a seat surface (pressure receiving seat surface), reference numeral 7 denotes a head opening, reference numeral 8 denotes a washer (sleeve washer), reference numeral 9 denotes a tightening nut, reference symbols 10, 10' denote chucks, and reference numeral 11 denotes a punching member.

The thick-wall small-diameter steel pipe 1 is comprised by a steel material made of relatively small-diameter thick-wall pipe of a stainless steel, trip steel, carbon steel for high-pressure piping, alloy steel and the like cut to a predetermined size in advance and having a pipe diameter D of 6 to 10 mm and a thickness t of approximately 1.25 to 3.5 mm.

The connecting head structure for high-pressure fuel injection pipes of the first embodiment shown in FIG. 1 comprises, at a connecting end of a thick-wall small-diameter steel pipe 1, a spherical seat surface 3 with the outer peripheral surface to a mating seat portion, an annular flange portion 5 provided with an interval from the seat surface 3 in the shaft center direction, a conical surface 4 continued from the seat surface 3 to the annular flange portion 5 and tapered toward the tip end and having an outline of a section in the pipe axial direction in a curved or a straight configuration, and a head opening 7 in a flare configuration and also has a connecting head 2 inside the thick-wall small-diameter steel pipe 1 in which there is little or no pocket, since a substantially flat cylindrical surface has the outline of a section in the pipe axial direction close to the diameter of the inner peripheral surface of the steel pipe 4. A soft layer 3a (decarbonized layer) may be provided on the seat surface 3.

In the above connecting head 2, an axial distance L1 from the connecting head end to the back face of the annular flange portion 5 is 0.38D to 0.6D, if the t/D of the thick-wall small-diameter steel pipe 1 is less than 0.3, while it is 0.38D to 0.7D, if the t/D of the thick-wall small-diameter steel pipe 1 is 0.3 or above, the spherical radius R of the seat surface 3 is 0.45D to 0.65D, and the outer diameter D1 of the annular flange portion 5 is 1.2D to 1.4D. A spherical center position P of the seat surface 3 is located on the non pipe-end side in the pipe axial direction of the annular flange portion 5 rather than the pipe tip-end position.

A connecting head structure for high-pressure fuel injection pipes of a second embodiment shown in FIGS. 2 and 3 has the spherical seat surface 3 with the outer peripheral surface to the mating seat portion, the annular flange portion 5 provided with an interval from the seat surface 3 in the shaft center direction, the conical surface 4 continued from the spherical seat surface 3 and having a vertex angle θ of 50 to 60 degrees on the annular flange portion side and the maximum diameter D3 of 1.03D to 1.09D, a cylindrical surface 4d continued from the maximum diameter portion of the conical surface 4 and formed between that and the annular flange portion 5, and the head opening 7 in the flare configuration and also has the connecting head 2 inside the thick-wall small-diameter steel pipe 1 in which there is little or no pocket, since a substantially flat cylindrical surface has the outline of a section in the pipe axial direction close to the diameter of the inner peripheral surface of the steel pipe 1.

In this connecting head, too, the axial distance L1 from the connecting head end to the back face of the annular flange portion 5, the spherical radius R of the seat surface 3 and the spherical center position of the seat surface 3 are the same as those shown in FIG. 1. In the figure, reference numeral 6 denotes a mating part and reference symbol 6a denotes a seat surface of the mating part 6.

A connecting head structure for high-pressure fuel injection pipes of a third embodiment shown in FIG. 4 has, similarly to that shown in FIGS. 2 and 3, the spherical seat surface 3 with the outer peripheral surface to the mating seat part, the annular flange potion 5 provided with an interval from the seat surface 3 in the shaft center direction, the conical surface 4 continued from the spherical seat surface 3 and having a vertex angle θ of 50 to 60 degrees on the annular flange portion side and the maximum diameter D3 of 1.03D to 1.09D, and a conical surface 4a continued from the maximum diameter D3 portion of the conical surface 4 and formed between that and the annular flange portion 5.

In this connecting head, too, the axial distance L1 from the connecting head end to the back face of the annular flange portion 5, the spherical radius R of the seat surface 3 and the spherical center position of the seat surface 3 are the same as those shown in FIG. 1.

A connecting head structure for high-pressure fuel injection pipes of a fourth embodiment shown in FIG. 5 has, similarly to those shown in FIG. 4, the spherical seat surface 3 with the outer peripheral surface to the mating seat part, the annular flange potion 5 provided with an interval from the seat surface 3 in the shaft center direction, the conical surface 4 continued from the spherical seat surface 3 and having a vertex angle θ of 50 to 60 degrees on the annular flange portion side and the maximum diameter D3 of 1.03D to 1.09D, and a cylindrical surface 4d continued from the maximum diameter D3 portion of the conical surface 4 and formed between that and the annular flange portion 5.

In this connecting head, too, the axial distance L1 from the connecting head end to the back face of the annular flange portion 5, the spherical radius R of the seat surface 3 and the spherical center position of the seat surface 3 are the same as those shown in FIG. 1.

A connecting head structure of a high-pressure fuel injection pipe of a fifth embodiment shown in FIG. 6 has the spherical seat surface 3 with the outer peripheral surface to the mating seat part, the annular flange potion 5 provided with an interval from the seat surface 3 in the shaft center direction, the conical surface 4 continued from the spherical seat surface 3 and having a vertex angle θ of 50 to 60 degrees on the annular flange portion side and the maximum diameter D3 of 1.03D to 1.09D, and a convex conical surface 4b continued from the maximum diameter D3 portion of the conical surface 4, formed between that and the annular flange portion 5 and having a radius of R1 and an outline of a pipe axial section in substantially an arc shape.

In this connecting head, too, the axial distance L1 from the connecting head end to the back face of the annular flange portion 5, the spherical radius R of the seat surface 3 and the spherical center position of the seat surface 3 are the same as those shown in FIG. 1.

A connecting head structure for high-pressure fuel injection pipes of a sixth embodiment shown in FIG. 7 has the spherical seat surface 3 with the outer peripheral surface to the mating seat part, the annular flange portion 5 provided with an interval from the seat surface 3 in the shaft center direction, the conical surface 4 continued from the spherical seat surface 3 and having a vertex angle θ of 50 to 60 degrees on the annular flange portion side and the maximum diameter D3 of 1.03D to 1.09D, and a projecting conical surface 4c continued from the maximum diameter D3 portion of the conical surface 4, formed between that and the annular flange portion 5 and having a radius of R2 and an outline of a pipe axial section in substantially a convex shape.

In this connecting head, too, the axial distance L1 from the connecting head end to the back face of the annular flange portion 5, the spherical radius R of the seat surface 3 and the spherical center position of the seat surface 3 are the same as those shown in FIG. 1.

In the case of the connecting head structure for high-pressure fuel injection pipes shown in FIG. 1, if the hardness of the injection pipe is higher than that of the mating part or close the hardness of the mating part as mentioned above, the seat surface 3 of the connecting head bites into the seat surface 6a (pressure receiving seat surface) of the mating part 6 as the tightening torque is increased as shown in FIG. 8 and the both are deformed, and an indentation 6a' shown by a hitting depth h might be generated on the mating seat surface 6a. However, in the case of the connecting head structure for high-pressure fuel injection pipes shown in FIGS. 2 to 7, since the angle of the conical surface 4 of the connecting head is large, the width of the contact surface is increased at tightening, and even if the hardness of the injection pipe is higher than that of the mating part 6 or close to the hardness of the mating part, the depth h of the indentation 6a' generated on the mating seat surface 6a can be improved, and a remaining deformation amount of the mating seat surface can be reduced.

Also, a washer 8 in the present invention shown in FIGS. 9 and 10 is closely fitted or freely fitted to a neck lower part of the annular flange portion 5 by means of crimping or the like. A tightening nut 9 contact surface 8-1 of the washer 8 is spherical and the spherical radius R2 is 1.0D to 2.5D. Moreover, a washer 8 contact surface 9-1 of the tightening nut 9 is a conical surface and the vertex angle θ of the cone is 90 to 150 degrees.

As a washer to be closely fitted or freely fitted to the neck lower part of the annular flange portion 5, a cylindrical washer having a flange at the head tip end side or the rear end side can be used other than a cylindrical one. In the case of a cylindrical washer having a flange at the head rear end side, the tightening nut contact surface is made also spherical. In the case of the cylindrical washer having a flange at the rear end side, the contact surface with the tightening nut 9 may be a flat surface perpendicular to the pipe shaft, a tapered surface whose diameter is reduced toward the rear of the pipe shaft or a convex spherical surface.

The connecting head 2 of the high-pressure fuel injection pipe of a seventh embodiment shown in FIG. 11 has a large diameter portion 2-1 continued from the back face of the annular flange portion 5 and having a pipe outer diameter D2 of 1.02D to 1.08D over the length L2 substantially corresponding to the length of the washer 8 and also has a tapered portion 2-2 continued from the large diameter portion 2-1 for a length L3 and whose outer diameter is smoothly reduced in the pipe shaft direction.

Also, an eighth embodiment shown in FIG. 12 illustrates the connecting head 2 for a high-pressure fuel injection pipe having a relatively thin pipe thickness (the inner diameter Din is 0.4D to 0.63D, for example) and a relatively large spherical body of the tip-end seat surface (the spherical radius R of the seat surface is 0.57D to 0.65D, for example), and the connecting head 2 has a conical surface 2a with the connecting head opening DT of 1.2Din to 1.6Din and the taper depth LT of the conical surface of 0.65L1 to 1.3L1 formed on the inner surface of the connecting head, when the inner diameter of the thick-wall small-diameter steel pipe 1 is Din. By providing the conical surface 2a at the inner diameter portion of the connecting head 2, the volume of a space constituting the connecting head can be increased so as to reduce the volume of a steel material, and by actively bringing the core metal into contact with the head inner surface in molding of the head by the head molding method employing a core metal, which will be described later, buckling is reduced, and a pocket is eliminated or reduced as much as possible.

Moreover, a ninth embodiment shown in FIG. 13 is a thick-wall small-diameter steel pipe with a relatively small pipe thickness (the inner diameter Din is 0.4D to 0.63D, for example) similarly to the high-pressure fuel injection pipe shown in the eighth embodiment shown in FIG. 12, and has the conical surface 2a with the connecting head opening DT of 1.2Din to 1.6Din and the taper depth LT of the conical surface of 0.65L1 to 1.3L1 formed on the inner surface of the connecting head, and a back face 5a of the annular flange portion 5 is made as the conical surface (tapered surface) whose diameter is reduced to the rear of the pipe shaft. In the case of the connecting head 2 in which the back face 5a of the annular flange portion 5 is made as a conical surface where pipe inner diameter Din is in a range of 0.4D to 0.63D, for example, by making the inner diameter portion in the conical configuration, the volume of the space constituting the connecting head can be increased so as to reduce the volume of the steel material, by which a pocket generated on the inner surface of the head can be eliminated or reduced as much as possible. The L1 in the connecting head structure in this embodiment is an axial distance between the connecting head end to the back-face side end of the annular flange portion 5 as shown in the figure.

The embodiments shown in FIGS. 12 and 13 illustrate the connecting head in which the conical surface 2a is formed with the taper depth LT of the conical surface at 1.3L1, which is longer than the axial distance L1 to the back face of the annular flange portion 5, but a tenth embodiment shown in FIG. 14 illustrates the connecting head in which the conical surface 2a is formed with the taper depth LT of the conical surface at 0.7L1, which is shorter than the axial distance L1 to the back face of the annular flange portion 5. In the case of the connecting head 2, by making the inner diameter portion conical, the volume of the space constituting the connecting head can be increased so as to reduce the volume of the steel material, a pocket generated on the head inner surface can be eliminated or reduced as much as possible.

A head molding method of the connecting head 2 for high-pressure fuel injection pipes shown in FIG. 1 according to the present invention will be described based on FIGS. 15 and 16.

In the present invention, the connecting head 2 is provided with a processing margin L and chucked by chucks 10, 10', and a punching member 11 is used in which a spherical surface 11-1, a conical surface 11-2, a flat portion 11-3, and a core metal 11-4 are formed corresponding to each of the spherical seat surface 3 of the connecting head 2, the conical surface 4, the annular flange portion 5, the washer 8, the axial distance L1 from the connecting head end to the annular flange portion back face, the annular flange portion outer diameter D1 and the spherical radius R of the seat surface 3.

In the head molding method shown in FIG. 15, the short and cylindrical washer 8 is incorporated at the end of the thick-wall small-diameter steel pipe 1 obtained by cutting to the specified product length and chamfering the opening end while leaving the head processing margin L of the connecting head at the tip end side in advance, and then, while holding the steel pipe 1 by the chuck 10, the tip end of the steel pipe 1 is pressed by the punching member 11 to the shaft center direction. By this pressing, the portion of the head processing margin of the thick-wall steel pipe 1 is plastically fluidized, and the connecting head 2 can be obtained at the tip end of the thick-wall steel pipe 1 comprising the spherical seat surface 3 with the outer peripheral surface to the mating seat potion, the annular flange portion 5 provided with an interval from the seat surface 3 in the shaft center direction, the conical surface 4 continued from the seat surface to the annular flange portion 5 and tapered toward the tip end, and the head opening 7 in the flare configuration and having the head inner peripheral surface with a substantially flat face close to the inner peripheral surface of the steel pipe and a compressive residual stress in the vicinity of the inner circumference of the head. In the case of this method, since the washer 8 is incorporated while leaving the head processing margin L of the connecting head at the tip end side in advance and then, press molding is performed in the state where the vicinity of the end is held by the chuck 10, the washer 8 is press-fitted into the neck lower part of the head, but the washer 8 may be attached to the neck lower part of the head after the press molding in the state where the washer 8 is separated from the chuck and freely fitted to the steel pipe. As a method for molding the connecting head in the state where the washer 8 is freely fitted, as shown in FIG. 16 as an example, in the state where the washer 8 is separated from the chuck 10' and freely fitted in the thick-wall small-diameter steel pipe 1 obtained by cutting to a specified product length and chamfering the opening end, the steel pipe is held by the chuck 10' while leaving the head processing margin L, and the tip end of the steel pipe 1 is pressed by the punching member 11 in the shaft center direction. By this pressing, similarly to the above, the portion of the head processing margin L of the thick-wall steel pipe 1 is plastically fluidized, and the connecting head 2 can be obtained at the tip end of the thick-wall steel pipe 1 comprising the spherical seat surface 3 with the outer peripheral surface to the mating seat potion, the annular flange portion 5 provided with an interval from the seat surface 3 in the shaft center direction, the conical surface 4 continued from the seat surface to the annular flange portion 5 and tapered toward the tip end, and the head opening 7 in the flare configuration and having the head inner peripheral surface with a substantially flat face close to the inner peripheral surface of the steel pipe and a compressive residual stress in the vicinity of the inner circumference of the head. In the case of this method, the washer 8 is moved to the neck lower part of the head and attached after press molding.

When the connecting head having the large diameter portion 2-1 and the taper portion 2-2 shown in FIG. 11 is to be molded, it is needless to say that the chucks 10, 10' according to the size of the large diameter portion 2-1 and the taper portion 2-2 are used. Also, in the case of the connecting head for high-pressure fuel injection pipes having the connecting opening end in the flare configuration, circular chamfered or round chamfered face or the connecting head for high-pressure fuel injection pipes with the inner diameter potion in the conical configuration, molding can be made by using the punching member 11 in the head molding method shown in FIG. 12 in which the root portion of the core metal 11-4 is made as a large diameter in the tapered configuration (see FIGS. 12, 13, 14 and 15 of Japanese Patent Publication No. 55-35220).

That is, according to the above molding method of the present invention, if the t/D of the thick-wall small-diameter steel pipe is less than 0.3, the axial distance L1 from the end of the connecting head 2 to the back face of the annular flange portion 5 is 0.38D to 0.6D, while if t/D is 0.3 or more, it is 0.38D to 0.7D, the spherical radius R of the seat surface 3 is 0.45D to 0.65D, and the outer diameter D1 of the annular flange portion 5 is 1.2D to 1.4D, and since the washer 8 is closely fitted or freely fitted to the neck lower part of the annular flange portion 5 and the inner peripheral surface of the head has a substantially flat surface close to the inner peripheral surface of the steel pipe, there is little pocket on the inner peripheral surface of the head and the connecting head 2 having a compressive residual stress in the vicinity of the inner circumference of the head can be obtained. Also, even in the case of the connecting head 2 for a high-pressure fuel injection pipe with a relatively small thickness and a relative large spherical body of the tip-end seat surface (the spherical radius R of the seat surface is 0.57D to 0.65D, for example), in addition to the condition of the axial distance L1, the spherical radius R of the seat surface 3 and the outer diameter D1 of the annular flange portion 5, by making the inside of the connecting head in the conical shape with the opening diameter DT of 1.2Din to 1.6Din and the taper depth LT of 0.65L1 to 1.3L1, a pocket is eliminated or reduced as much as possible.

In the connecting head structure for high-pressure fuel injection pipes shown in FIGS. 2 to 7, the vertex angle of the conical surface on the connecting head side and the maximum diameter of the conical surface are specified as means for preventing deformation (indentation) on the seat surface of the mating part, but on the contrary, a convex part allowing for a deformation amount of the seat surface of the mating part may be formed in advance on the seat surface of the mating part. As a condition for the convex part formed on the mating part in this case, a material of the injection pipe and the mating part, hardness of the seat surface, the width of the contact surface and the like should be considered in setting.

In the connecting head 2 on the present invention, the soft layer (decarbonized layer) provided on the seat surface 3 is provided by heat treatment before molding or after molding.

Here, the connecting head 2 is shown with the back face of the annular flange portion 5 having the annular flat surface perpendicular to the pipe shaft and the conical surface (tapered surface) whose diameter is reduced to the rear of the pipe shaft, but it is needless to say that the back face of the annular flange portion 5 is not limited to the annular flat surface perpendicular to the pipe shaft and the conical surface (tapered surface) whose diameter is reduced to the rear of the pipe shaft, but it may be an annular projecting spherical surface or recess spherical surface or a projecting or recess surface whose diameter is reduced toward the rear of the pipe shaft.

First Embodiment

Using a thick-wall small-diameter steel pipe with the pipe diameter D of 8.0 mm, the pipe inner diameter Din of 4.0 mm and the thickness t of 2.0 mm (t/D=0.25), (material: EN E355), after the opening end of the steel pipe is chamfered, the connecting head shown in FIG. 1 is molded by the head molding method shown in FIG. 15. For the pipe diameter D and the thickness t of the thick-wall small-diameter steel pipe in this embodiment, the axial distance L1 from the connecting head end of the obtained connecting head to the annular flange portion back face, the spherical radius R of the seat surface, and the annular flange portion outer diameter D1 are L1=3.9 mm, R=4.2 mm, and D1=10.0 mm, respectively, but generation of a pocket (annular recess) is not found on the inner peripheral surface of the connecting head.

Second Embodiment

Using a thick-wall small-diameter steel pipe with the pipe diameter D of 8.0 mm, the pipe inner diameter Din of 4.0 mm and the thickness t of 2.0 mm (t/D=0.25) (material: EN E355), after the opening end of the steel pipe is chamfered, the connecting head with the sectional structure shown in FIG. 3 is molded using the punching member 11 with the root portion of the core metal 11-4 in the tapered configuration with a large diameter by the head molding method shown in FIG. 15. For the pipe diameter D and the thickness t of the thick-wall small-diameter steel pipe in this embodiment, the axial distance L1 from the connecting head end of the obtained connecting head to the annular flange portion back face, the spherical radius R of the seat surface, the annular flange portion outer diameter D1, the vertex angle θ of the conical surface and the maximum diameter D3 of the conical surface are L1=3.9 mm, R=4.2 mm, D1=10.0 mm, θ=56 degrees, and D3=8.5 mm, and the hardness of the vicinity of the seat surface is Hv 320.

In order to examine deformation of the seat surface (pressure receiving seat surface) of the mating part when the injection pipe having this connecting head is assembled to the mating part with the hardness of the vicinity of the seat surface at Hv 280 and then, released, the injection pipe is tightened to the mating part with the fastening load of 25 kN and then, released. Then, the hitting depth h remaining on the seat surface is 25 μm in the case of the connecting head shown in FIG. 1, while it is 15 μm in the case of the connecting head of this embodiment, which shows that the deformation amount remaining on the seat surface of the mating part can be improved by 40%.

Third Embodiment

Using a thick-wall small-diameter steel pipe with the pipe diameter D of 6.0 mm, the pipe inner diameter Din of 3.0 mm and the thickness t of 1.5 mm (t/D=0.25) (material: EN E355), after the opening end of the steel pipe is chamfered, the connecting head with the conical surface shown in FIG. 12 is molded using the punching member 11 with the root portion of the core metal 11-4 in the tapered configuration with a large diameter by the head molding method shown in FIG. 15. For the pipe diameter D, the pipe inner diameter Din, and the thickness t of the thick-wall small-diameter steel pipe in this embodiment, the axial distance L1 from the connecting head end of the obtained connecting head to the annular flange portion back face, the spherical radius R of the seat surface, the annular flange portion outer diameter D1, the taper depth LT of the conical surface, and the tip-end opening diameter DT are L1=3.0 mm, R=3.75 mm, D1=8.4 mm, LT=2.8 mm, DT=4.2 mm, and generation of a pocket (annular recess) is hardly found on the inner peripheral surface of the connecting head.

Fourth Embodiment

Using a thick-wall small-diameter steel pipe with the pipe diameter D of 6.0 mm, the pipe inner diameter Din of 3.0 mm and the thickness t of 1.5 mm (t/D=0.25) (material: EN E355), after the opening end of the steel pipe is chamfered, the connecting head with the conical surface shown in FIG. 12 is molded using the punching member 11 with the root portion of the core metal 11-4 in the tapered configuration with a large diameter by the head molding method shown in FIG. 15. For the pipe diameter D, the pipe inner diameter Din, and the thickness t of the thick-wall small-diameter steel pipe in this embodiment, the axial distance L1 from the connecting head end of the obtained connecting head to the annular flange portion back face, the spherical radius R of the seat surface, the annular flange portion outer diameter D1, the taper depth LT of the conical surface, the tip-end opening diameter DT, and the vertex angle θ2 of the back face 5a of the annular flange portion 5 are L1=2.8 mm, R=3.75 mm, D1=8.4 mm, LT=3.5 mm, DT=3.8 mm, and θ2=90 degrees, and a pocket (annular recess) is generated only extremely slightly on the inner peripheral surface of the connecting head.

Fifth Embodiment

Using a thick-wall small-diameter steel pipe with the pipe diameter D of 6.35 mm, the pipe inner diameter Din of 4.0 mm and the thickness t of 1.675 mm (t/D=0.264) (material:

EN E355), after the opening end of the steel pipe is chamfered, the connecting head shown in FIG. 1 is molded by the head molding method shown in FIG. 15. For the pipe diameter D and the thickness t of the thick-wall small-diameter steel pipe in this embodiment, the axial distance L1 from the connecting head end of the obtained connecting head to the annular flange portion back face, the spherical radius R of the seat surface, and the annular flange portion outer diameter D1 are L1=2.5 mm, R=3.75 mm, and D1=8.2 mm, respectively, and generation of a pocket (annular recessed portion) is not found on the inner peripheral surface of the connecting head.

Sixth Embodiment

Using a thick-wall small-diameter steel pipe with the pipe diameter D of 9.0 mm, the pipe inner diameter Din of 4.0 mm and the thickness t of 2.5 mm (t/D=0.278) (material: EN E355), after the opening end of the steel pipe is chamfered, the connecting head with the sectional structure shown in FIG. 3 is molded using the punching member 11 with the root portion of the core metal 11-4 in the tapered configuration with a large diameter by the head molding method shown in FIG. 15. For the pipe diameter D and the thickness t of the thick-wall small-diameter steel pipe in this embodiment, the axial distance L1 from the connecting head end of the obtained connecting head to the annular flange portion back face, the spherical radius R of the seat surface, the annular flange portion outer diameter D1, the vertex angle θ of the conical surface, and the maximum diameter D3 of the conical surface are L1=4.5 mm, R=4.75 mm, D1=12 mm, θ=56 degrees, and D3=9.4 mm, and the hardness of the vicinity of the seat surface is Hv 320.

In order to examine deformation of the seat surface (pressure receiving seat surface) of the mating part when the injection pipe having this connecting head is assembled to the mating part with the hardness of the vicinity of the seat surface at Hv 280 and then, released, the injection pipe is tightened to the mating part with the fastening load of 25 kN and then, released. Then, the hitting depth h remaining on the seat surface is 25 μm in the case of the connecting head shown in FIG. 1, while it is 15 μm in the case of the connecting head of this embodiment, which shows that the deformation amount remaining on the seat surface of the mating part can be improved by 40%.

Seventh Embodiment

Using a thick-wall small-diameter steel pipe with the pipe diameter D of 7.0 mm, the pipe inner diameter Din of 3.0 mm and the thickness t of 2.0 mm (t/D=0.286) (material: EN E355), after the opening end of the steel pipe is chamfered, the connecting head with the conical surface shown in FIG. 12 is molded using the punching member 11 with the root portion of the core metal 11-4 in the tapered configuration with a large diameter by the head molding method shown in FIG. 15. For the pipe diameter D, the pipe inner diameter Din, and the thickness t of the thick-wall small-diameter steel pipe in this embodiment, the axial distance L1 from the connecting head end of the obtained connecting head to the annular flange portion back face, the spherical radius R of the seat surface, the annular flange portion outer diameter D1, the taper depth LT of the conical surface, and the tip-end opening diameter DT are L1=3.5 mm, R=3.7 mm, D1=9.2 mm, LT=3.0 mm, and DT=3.7 mm, and generation of a pocket (annular recess) is hardly found on the inner peripheral surface of the connecting head.

Eighth Embodiment

Using a thick-wall small-diameter steel pipe with the pipe diameter D of 10 mm, the pipe inner diameter Din of 4.0 mm and the thickness t of 3.0 mm (t/D=0.3) (material: EN E355), after the opening end of the steel pipe is chamfered, the connecting head shown in FIG. 1 is molded by the head molding method shown in FIG. 15. For the pipe diameter D and the thickness t of the thick-wall small-diameter steel pipe in this embodiment, the axial distance L1 from the connecting head end of the obtained connecting head to the annular flange portion back face, the spherical radius R of the seat surface, and the annular flange portion outer diameter D1 are L1=5.0 mm, R=5.5 mm, and D1=13.0 mm, respectively, and generation of a pocket (annular recessed portion) is not found on the inner peripheral surface of the connecting head.

Ninth Embodiment

Using a thick-wall small-diameter steel pipe with the pipe diameter D of 9 mm, the pipe inner diameter Din of 3.5 mm and the thickness t of 2.75 mm (t/D=0.306) (material: EN E355), after the opening end of the steel pipe is chamfered, the connecting head with the sectional structure shown in FIG. 3 is molded using the punching member 11 with the root portion of the core metal 11-4 in the tapered configuration with a large diameter by the head molding method shown in FIG. 15. For the pipe diameter D and the thickness t of the thick-wall small-diameter steel pipe in this embodiment, the axial distance L1 from the obtained connecting head end of the obtained connecting head to the annular flange portion back face, the spherical radius R of the seat surface, the annular flange portion outer diameter D1, the vertex angle θ of the conical surface, and the maximum diameter D3 of the conical surface are L1=4.5 mm, R=4.75 mm, D1=12.0 mm, θ=56 degrees, and D3=9.4 mm, and the hardness of the vicinity of the seat surface is Hv 320.

In order to examine deformation of the seat surface (pressure receiving seat surface) of the mating part when the injection pipe having this connecting head is assembled to the mating part with the hardness of the vicinity of the seat surface at Hv 280 and then, released, the injection pipe is tightened to the mating part with the fastening load of 25 kN and then, released. Then, the hitting depth h remaining on the seat surface is 25 μm in the case of the connecting head shown in FIG. 1, while it is 15 μm in the case of the connecting head of this embodiment, which shows that the deformation amount remaining on the seat surface of the mating part can be improved by 40%.

Tenth Embodiment

Using a thick-wall small-diameter steel pipe with the pipe diameter D of 8 mm, the pipe inner diameter Din of 3.0 mm and the thickness t of 2.5 mm (t/D=0.313) (material: EN E355), after the opening end of the steel pipe is chamfered, the connecting head with the conical surface shown in FIG. 12 is molded using the punching member 11 with the root portion of the core metal 11-4 in the tapered configuration with a large diameter by the head molding method shown in FIG. 15. For the pipe diameter D, the pipe inner diameter Din, and the thickness t of the thick-wall small-diameter steel pipe in this embodiment, the axial distance L1 from the connecting head end of the obtained connecting head to the annular flange portion back face, the spherical radius R of the seat surface, and the annular flange portion outer diameter D1 are L1=5.1 mm, R=4.325 mm, and D1=11.0 mm, and generation of a pocket (annular recess) is hardly found on the inner peripheral surface of the connecting head.

Eleventh Embodiment

Using a thick-wall small-diameter steel pipe with the pipe diameter D of 9 mm, the pipe inner diameter Din of 3.0 mm and the thickness t of 3 mm (t/D=0.333) (material: EN E355), after the opening end of the steel pipe is chamfered, the connecting head with the conical surface shown in FIG. 12 is molded using the punching member 11 with the root portion of the core metal 11-4 in the tapered configuration with a large diameter by the head molding method shown in FIG. 15. For the pipe diameter D, the pipe inner diameter Din, and the thickness t of the thick-wall small-diameter steel pipe in this embodiment, the axial distance L1 from the connecting head end of the obtained connecting head to the annular flange portion back face, the spherical radius R of the seat surface, the annular flange portion outer diameter D1, the taper depth LT of the conical surface, the tip-end opening diameter DT, and the vertex angle $\theta 2$ of the back face 5a of the annular flange portion 5 are L1=6.3 mm, R=4.75 mm, D1=12.0 mm, LT=4.0 mm, DT=3.7 mm, and $\theta 2$=90 degrees, and a pocket (annular recessed portion) is generated only extremely slightly on the inner peripheral surface of the connecting head.

Twelfth Embodiment

Using a thick-wall small-diameter steel pipe with the pipe diameter D of 10 mm, the pipe inner diameter Din of 3.0 mm and the thickness t of 3.5 mm (t/D=0.35) (material: EN E355), after the opening end of the steel pipe is chamfered, the connecting head shown in FIG. 1 is molded by the head molding method shown in FIG. 15. For the pipe diameter D and the thickness t of the thick-wall small-diameter steel pipe in this embodiment, the axial distance L1 from the connecting head end of the obtained connecting head to the annular flange portion back face, the spherical radius R of the seat surface, and the annular flange portion outer diameter D1 are L1=7.0 mm, R=5.5 mm, and D1=13.0 mm, respectively, and generation of a pocket (annular recessed portion) is not found on the inner peripheral surface of the connecting head.

INDUSTRIAL APPLICABILITY

Since there is little pocket (annular recessed portion) generated inside the connecting head by plastic machining in the connecting head for high-pressure fuel injection pipes according to the present invention, a fear of generation of a crack at a trough part of a pocket portion in molding of the head, generation of a crack involved with cavitation erosion by fluid pressure in the head, and a phenomenon of a tensile stress rise on the inner surface due to increase of the inner diameter and stress concentration involved with formation of the pocket in molding of the head can be eliminated, and a possibility that the inner peripheral surface of the head to become a starting point of fatigue breakdown can be drastically reduced. Also, by increasing the vertex angle and the maximum diameter of the conical surface of the connecting head, the width of the contact width of the both seat surfaces is increased at tightening, rise of the maximum contact surface pressure is prevented and a remaining deformation amount of the mating seat surface can be reduced at release of the tightening.

Moreover, in the connecting head structure according to the present invention, even if the thickness of the high-pressure fuel injection pipe is relatively small and the spherical body of the connecting head seat surface is relatively large, by making the inner diameter portion of the connecting head in the conical configuration, a pocket can be made small and moreover, even if the annular flange portion back face is conical, the pocket can be made small.

Furthermore, if a soft layer is provided on the seat surface, plastic deformation of the seal surface (seat surface) of the mating part joint portion such as a common rail can be further decreased, and high sealing performance can be obtained in repeated fastening. Moreover, in the connecting head of the present invention, since the distance from the head end to the annular flange portion is relatively reduced, rigidity of the spherical seat portion is enhanced, permanent deformation such as narrowing of the head opening involved with fastening can be prevented, and seating with respect to a pressure receiving seat surface of the mating part joint portion is stabilized. Also, fuel diffusion due to leakage or disengagement of a connection portion can be prevented against repeated pressurization of a super high-pressure fuel flow and vibration of a diesel internal-combustion engine or the like, and combined with smoothing action of the fuel flow due to absence of the pocket, accurate fuel injection is enabled.

Therefore, the present invention can be applied not only to a high-pressure fuel injection pipe disposed and used as a supply passage for a fuel in a diesel internal-combustion engine, for example, but also to various types of high-pressure metal piping having a connecting head by a thick-wall steel pipe with a relatively small diameter.

The invention claimed is:

1. A connecting head structure for a high-pressure fuel injection pipe, the connecting head structure comprising: a steel pipe having a pipe wall with inner and outer substantially cylindrical surfaces defining a wall thickness t and an outer diameter D selected so that t/D 0.3;
   a spherical seat surface having a spherical radius R and defining a connecting head end at an axial end of the pipe;
   an annular flange spaced from the spherical seat surface in an axial direction and having a back face facing away from the spherical seat surface, the annular flange having an outer diameter D1 and the back face being spaced from the connecting head end in an axial direction by a distance L1;
   a conical surface extending from the spherical surface toward the annular flange and being tapered toward the spherical seat surface, wherein
   the connecting head structure is configured so that the distance L1 in the axial direction from the connecting head end to the back face of the annular flange is 0.38D to 0.6D, the spherical radius R of the spherical seat surface is 0.45D to 0.65D, and the outer diameter D1 of the annular flange is 1.2D to 1.4D; and wherein
   the connecting head structure has an inner peripheral surface defining a substantially straight cylindrical face with a diameter substantially conforming to an inner diameter of the inner cylindrical surface of the pipe rearward of the connecting head structure or defining a conical face.

2. A connecting head structure for a high-pressure fuel injection pipe, the connecting head structure comprising: a steel pipe having a pipe wall with inner and outer substantially cylindrical surfaces defining a wall thickness t and an outer diameter D selected so that t/D>0.37;
   a spherical seat surface having a spherical radius R and defining a connecting head end at an axial end of the pipe;

an annular flange spaced from the spherical seat surface in an axial direction and having a back face facing away from the spherical seat surface, the annular flange having an outer diameter D1 and the back face being spaced from the connecting head end in an axial direction by a distance L1; and a conical surface extending from the spherical surface toward the annular flange and being tapered toward the spherical seat surface, wherein the connecting head structure is configured so that the distance L1 in the axial direction from the connecting head end to the back face of the annular flange is 0.38D to 0.7D, the spherical radius R of the spherical seat surface is 0.45D to 0.65D, and the outer diameter D1 of the annular flange portion is 1.2D to 1.4D, and the connecting head structure has an inner peripheral surface defining a substantially straight cylindrical surface with a diameter substantially conforming to an inner diameter of the inner cylindrical surface of the pipe rearward of the connecting head structure or defining a conical surface.

3. The connecting head structure for a high-pressure fuel injection pipe according to claim 1, wherein a vertex angle $\theta$ of the conical surface of the connecting head structure continued from the spherical seat surface toward the annular flange is 50 to 60 degrees;

a maximum diameter D3 of the conical surface is 1.03D to 1.09D; and the connecting head structure includes a portion extending from the conical surface to the annular flange that defines a conical surface, a conical surface with a convex or concave outline, or a cylindrical surface.

4. The connecting head structure for a high-pressure fuel injection pipe according to claim 1, wherein the annular flange projects out in a pipe radial direction from a maximum diameter end of the spherical seat surface.

5. The connecting head structure for a high-pressure fuel injection pipe according to claim 1, further comprising:

a cylindrical washer or a cylindrical washer with flange closely fitted or freely fitted to a neck lower part adjacent the back face of the annular flange.

6. The connecting head structure for a high-pressure fuel injection pipe according to claim 5, wherein:

the pipe has a large diameter portion continuing from the back face of the annular flange and extending over a length corresponding to a length of the washer, the large diameter portion of the pipe having an outer diameter of 1.02D to 1.08D and a tapered portion continued from the large diameter portion and having an outer diameter smoothly reduced in the pipe axial direction.

7. The connecting head structure for a high-pressure fuel injection pipe according to claim 6, wherein the length of the washer is 0.5D to 2.0D.

8. The connecting head structure for a high-pressure fuel injection pipe according to claim 5, wherein an end of the washer opposite the flange defines a tightening nut contact surface defining a spherical surface with a spherical radius of 1.0D to 2.5D.

9. The connecting head structure for high-pressure fuel injection pipe according to claim 5, further comprising:

a tightening nut having a washer contact surface for contacting the tightening nut contact surface of the washer, the washer contact surface of the tightening nut defining a conical surface with a vertex angle $\theta 1$ at 90 to 150 degrees.

10. The connecting head structure for a high-pressure fuel injection pipe according to claim 1, further comprising:

a soft layer provided on the spherical seat surface.

11. The connecting head structure for a high-pressure fuel injection pipe according to claim 10, wherein the soft layer is a decarbonized layer.

12. The connecting head structure for a high-pressure fuel injection pipe according to claim 1, wherein the inner peripheral surface of the connecting head structure at the axial end of the pipe defines a connecting head opening with a flare configuration formed by tapered chamfering or round chamfering.

13. The connecting head structure for a high-pressure fuel injection pipe according to claim 12, wherein the a diameter of the inner cylindrical surface of the pipe rearward of the connecting head structure is Din, the a connecting head opening defining a conical inner surface with an inner diameter DT of 1.2Din to 1.6Din and an axial length Lt of the conical inner surface being 0.65L1 to 1.3L1.

14. The connecting head structure for a high-pressure fuel injection pipe according to claim 13, wherein the back face of the annular flange is a substantially planar face perpendicular to the axial direction or a conical surface with a diameter reduced at farther distances from the spherical seat surface.

15. The connecting head structure for a high-pressure fuel injection pipe according to claim 14, wherein a vertex angle $\theta 2$ of the conical surface of the back face of the annular flange portion is 75 to 120 degrees.

16. The connecting head structure for a high-pressure fuel injection pipe according to claim 13, wherein the spherical radius R of the seat surface is 0.57D to 0.65D.

17. The connecting head structure for a high-pressure fuel injection pipe according to claim 1, wherein the inner peripheral surface of the connecting head structure has the conical face, and the back face of the annular flange is a conical surface.

18. The connecting head structure for a high-pressure fuel injection pipe according to claim 13, wherein the inner peripheral surface of the connecting head structure has the conical face, and the inner diameter Din of the thick-wall small-diameter steel pipe is 0.4D to 0.63D.

19. The connecting head structure for a high pressure fuel injection pipe according to claim 1 or 2, further comprising:

a tightening nut directly or indirectly engaging the back face of the annular flange.

* * * * *

UNITED STATES PATENT AND TRADEMARK OFFICE
CERTIFICATE OF CORRECTION

PATENT NO. : 8,186,724 B2
APPLICATION NO. : 12/225025
DATED : May 29, 2012
INVENTOR(S) : Nobuo Kato et al.

Page 1 of 1

It is certified that error appears in the above-identified patent and that said Letters Patent is hereby corrected as shown below:

In the Claims

Column 18, Claim 1, line 35 should read as follows:

outer diameter D selected so that t/D<0.3;

Column 18, Claim 2, line 64 should read as follows:

outer diameter D selected so that t/D≥0.3;

Signed and Sealed this
Twenty-second Day of July, 2014

Michelle K. Lee
*Deputy Director of the United States Patent and Trademark Office*